United States Patent
Ashraf et al.

(10) Patent No.: US 11,818,568 B2
(45) Date of Patent: Nov. 14, 2023

(54) REFERENCE SIGNAL MANAGEMENT FOR SIDELINK RADIO TRANSMISSION

(71) Applicant: Telefonaktiebolaget LM Ericsson (publ), Stockholm (SE)

(72) Inventors: Shehzad Ali Ashraf, Aachen (DE); Ricardo Blasco Serrano, Espoo (FI); Wanlu Sun, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 493 days.

(21) Appl. No.: 17/264,964

(22) PCT Filed: Aug. 3, 2018

(86) PCT No.: PCT/EP2018/071175
§ 371 (c)(1),
(2) Date: Feb. 1, 2021

(87) PCT Pub. No.: WO2020/025147
PCT Pub. Date: Feb. 6, 2020

(65) Prior Publication Data
US 2021/0314962 A1 Oct. 7, 2021

(51) Int. Cl.
*H04W 72/02* (2009.01)
*H04W 72/542* (2023.01)
(Continued)

(52) U.S. Cl.
CPC ......... *H04W 72/542* (2023.01); *H04W 72/02* (2013.01); *H04W 72/20* (2023.01); *H04W 72/541* (2023.01)

(58) Field of Classification Search
CPC . H04L 25/0224; H04L 5/0048; H04L 5/0094; H04W 72/542; H04W 72/02;
(Continued)

(56) References Cited

U.S. PATENT DOCUMENTS

2013/0229931 A1* 9/2013 Kim .................. H04L 5/0053
370/252
2017/0353971 A1* 12/2017 Gupta .................. H04W 74/04
(Continued)

FOREIGN PATENT DOCUMENTS

WO         2015176255 A1    11/2015
WO    WO-2015176255 A1 *  11/2015    ............ H04W 88/18
(Continued)

OTHER PUBLICATIONS

International Search Report and Written Opinion dated Apr. 25, 2019 for International Application No. PCT/EP2018/071175 filed on Aug. 3, 2018, consisting of 26-pages.
(Continued)

*Primary Examiner* — Lan-Huong Truong
(74) *Attorney, Agent, or Firm* — Christopher & Weisberg, P.A.

(57) ABSTRACT

A first radio device may send SL control information to a second radio device. The SL control information indicates at least one radio resource for transmission of a reference signal from the first radio device. The second radio device receives the reference signal. Further, the second radio device may forward the received sidelink control information to one or more other radio devices. Based on the received reference signal, the second radio device estimates quality of a radio channel between the first radio device and the second radio device. The estimated quality of the radio channel, may be used to control an SL radio transmission between the first radio device and the second radio device.

20 Claims, 15 Drawing Sheets

(51) Int. Cl.
*H04W 72/20* (2023.01)
*H04W 72/541* (2023.01)

(58) Field of Classification Search
CPC ... H04W 72/20; H04W 72/541; H04W 88/04; H04W 92/18; H04W 24/10; H04W 76/14
See application file for complete search history.

(56) References Cited

U.S. PATENT DOCUMENTS

| | | |
|---|---|---|
| 2018/0035435 A1 | 2/2018 | Gupta et al. |
| 2018/0198580 A1 | 7/2018 | Nammi et al. |
| 2019/0068342 A1* | 2/2019 | Kumar Parameswarn Rajamma ............ H04W 72/542 |

FOREIGN PATENT DOCUMENTS

| | | |
|---|---|---|
| WO | 2016165124 A1 | 10/2016 |
| WO | 2016181094 A1 | 11/2016 |
| WO | 2017171895 A1 | 10/2017 |
| WO | 2018097947 A2 | 5/2018 |

OTHER PUBLICATIONS

ETSI TS 136 201 V14.1.0; LTE; Evolved Universal Terrestrial Radio Access (E-UTRA); LTE physical layer, General description (3GPP TS 36.201 version 14.1.0 Release 14); Apr. 2017, consisting of 17-pages.

ETSI TS 136 213 V14.5.0; LTE; Evolved Universal Terrestrial Radio Access (E-UTRA); Physical layer procedures (3GPP TS 36.213 version 14.5.0 Release 14); Jan. 2018, consisting of 464-pages.

3Gpp TSG RAN WG1 Meeting #80bis R1-151964; Title: Resource Allocation for UE-to-Network Relay; Source: NTT DOCOMO; Agenda Item: 7.2.3.2.1; Document for: Discussion and Decision; Date and Location: Apr. 20-24, 2015, Belgrade, Serbia, consisting of 4-pages.

EPO Communication dated Feb. 21, 2023 for Patent Application No. 18752729.6, consisting of 10-pages.

* cited by examiner

REFERENCE SIGNAL MANAGEMENT FOR SIDELINK RADIO TRANSMISSION

TECHNICAL FIELD

The present invention relates to methods for controlling radio transmissions and to corresponding radio devices, systems, and computer programs.

BACKGROUND

In a wireless communication network a transmission direction from the wireless communication network to a UE (user equipment) is typically referred to as "downlink" (DL) direction, while a transmission direction from the UE to the wireless communication network is typically referred to as "uplink" (UL) direction. In addition to DL radio transmissions and UL radio transmissions, it is known to support direct radio transmissions between UEs. These direct radio transmissions may be referred to as "sidelink" (SL) radio transmissions. For example, in the case of the LTE (Long Term Evolution) radio technology specified by 3GPP ($3^{rd}$ Generation Partnership Project), SL radio transmissions are defined in 3GPP TS 36.201 V14.1.0 (2017-03). The SL radio transmissions may for example be used for V2X (vehicle-to-anything) communications, which may for example include: V2V (vehicle-to-vehicle) communications between vehicles; V2P (vehicle-to-pedestrian) communications between a vehicle and a device carried by an individual, e.g., a handheld terminal carried by a pedestrian, cyclist, driver, or passenger; V2I (vehicle-to-infrastructure) communications between a vehicle and a roadside unit (RSU) of traffic infrastructure, e.g., an entity transmitting speed limit notifications, and V2N (vehicle-to-network) communications between a vehicle and a node of the wireless communication network. As a general rule, V2X communications may utilize network infrastructure when available. However, at least basic V2X communication functionalities should also be possible without network infrastructure, e.g., outside network coverage.

In the LTE radio technology, SL radio transmissions are performed using a physical SL control channel (PSCCH) and a physical SL shared channel (PSSCH). The PSCCH carries SL control information (SCI) which may for example indicate scheduling information for a data transmission on the PSSCH. The SCI may indicate radio resources allocated for the data transmission of the PSSCH, a modulation and coding scheme (MCS) to be used for the data transmission of the PSSCH, a retransmission index, an intention to reserve the same radio resources for a future data transmission, and a priority level in terms of a PPPP (ProSe Per-Packet Priority). The PSCCH has a fixed size of two resource blocks (RBs) and is transmitted in the same subframe with the data transmission on the PSSCH.

In the LTE radio technology, the SL radio transmissions are performed in a broadcast mode. Accordingly, an SL radio transmission is not optimized for a specific recipient and there is no need to support mechanisms for considering the characteristics of a radio channel between the transmitter of the SL radio transmission and a specific recipient. However, future enhancements of the LTE radio technology or other radio technologies, e.g., a 5G radio technology like the NR (New Radio) technology currently developed by 3GPP, could also support unicast mode SL radio transmissions.

Accordingly, there is a need for techniques which allow for efficiently controlling SL radio communications.

SUMMARY

According to an embodiment, a method of controlling SL radio transmissions in a wireless communication network is provided. According to the method, a radio device receives SL control information from a further radio device. The SL control information indicates at least one radio resource for transmission of a reference signal from the further radio device. The radio device receives the reference signal on the at least one radio resource indicated by the SL control information. Based on the received reference signal, the radio device estimates quality of a radio channel between the radio device and the further radio device. Based on the estimated quality of the radio channel, the radio device controls an SL radio transmission from the radio device to the further radio device. Alternatively or in addition, the radio device sends a report of the estimated quality of the radio channel to the further radio device.

According to a further embodiment, a method of controlling SL radio transmissions in a wireless communication network is provided. According to the method, a radio device sends SL control information to a further radio device. The SL control information indicates at least one radio resource for transmission of a reference signal from the radio device. Further, the radio device sends the reference signal on the at least one radio resource indicated by the SL control information to enable the further radio device to estimate a quality of a radio channel between the further radio device and the radio device based on the reference signal. The radio device receives an SL radio transmission from the further radio device, the SL radio transmission being controlled based on the quality of the radio channel estimated by the further radio device. Alternatively or in addition, the radio device receives a report of the estimated quality of the radio channel from the further radio device and controls an SL radio transmission from the radio device to the further radio device based on the estimated quality of the radio channel.

According to a further embodiment, a method of controlling SL radio transmissions in a wireless communication network is provided. According to the method, a radio device receives SL control information from a further radio device. The SL control information indicates at least one radio resource for transmission of a reference signal from the further radio device. Further, the radio device forwards the received SL control information to one or more other radio devices.

According to a further embodiment, a method of controlling SL radio transmissions in a wireless communication network is provided. According to the method, a radio device determines, based on negotiation with a further radio device, at least one first radio resource for sending first SL control information by the further radio device. The SL control information indicates at least one second radio resource for transmission of a reference signal from the further radio device. Further, the radio device sends second SL control information on the indicated at least one first radio resource to one or more other radio devices. The second SL control information indicates the at least one second radio resource to the one or more other radio devices.

According to a further embodiment, a method of controlling SL radio transmissions in a wireless communication network is provided. According to the method, a radio device sends SL radio transmissions and reference signals on at least one radio resource which is further being utilized for SL radio transmissions and transmissions of reference signals by at least one other radio device. Further, the radio device configures a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device.

According to a further embodiment, a method of controlling SL radio transmissions in a wireless communication network is provided. According to the method, a node of the wireless communication network provides control information to multiple radio devices utilizing at least one radio resource for SL radio transmissions and transmissions of reference signals. The control information configures a time interval between an instance of transmission of the reference signals and a subsequent instance of transmission of the SL radio transmissions to be the same for each of the multiple radio devices.

According to a further embodiment, a radio device for a wireless communication network is provided. The radio device is configured to receive SL control information from a further radio device. The SL control information indicates at least one radio resource for transmission of a reference signal from the further radio device. Further, the radio device is configured to receive the reference signal on the at least one radio resource indicated by the SL control information. Further, the radio device is configured to estimate, based on the received reference signal, quality of a radio channel between the radio device and the further radio device. Further, the radio device is configured to control, based on the estimated quality of the radio channel, an SL radio transmission from the radio device to the further radio device. Alternatively or in addition, the radio device is configured to send a report of the estimated quality of the radio channel to the further radio device.

According to a further embodiment, a radio device for a wireless communication network is provided. The radio device comprises at least one processor and a memory containing instructions executable by said at least one processor, whereby the radio device is operative to receive SL control information from a further radio device. The SL control information indicates at least one radio resource for transmission of a reference signal from the further radio device. Further, the memory contains instructions executable by said at least one processor, whereby the radio device is operative to receive the reference signal on the at least one radio resource indicated by the SL control information. Further, the memory contains instructions executable by said at least one processor, whereby the radio device is operative to estimate, based on the received reference signal, quality of a radio channel between the radio device and the further radio device. Further, the memory contains instructions executable by said at least one processor, whereby the radio device is operative to control, based on the estimated quality of the radio channel, an SL radio transmission from the radio device to the further radio device. Alternatively or in addition, the memory contains instructions executable by said at least one processor, whereby the radio device is operative to send a report of the estimated quality of the radio channel to the further radio device.

According to a further embodiment, a radio device for a wireless communication network is provided. The radio device is configured to send SL control information to a further radio device. The SL control information indicates at least one radio resource for transmission of a reference signal from the radio device. Further, the radio device is configured to send the reference signal on the at least one radio resource indicated by the SL control information to enable the further radio device to estimate a quality of a radio channel between the further radio device and the radio device based on the reference signal. The radio device is configured to receive an SL radio transmission from the further radio device, the SL radio transmission being controlled based on the quality of the radio channel estimated by the further radio device. Alternatively or in addition, the radio device is configured to receive a report of the estimated quality of the radio channel from the further radio device and control an SL radio transmission from the radio device to the further radio device based on the estimated quality of the radio channel.

According to a further embodiment, a radio device for a wireless communication network is provided. The radio device comprises at least one processor and a memory containing instructions executable by said at least one processor, whereby the radio device is operative to send SL control information to a further radio device. The SL control information indicates at least one radio resource for transmission of a reference signal from the radio device. Further, the memory contains instructions executable by said at least one processor, whereby the radio device is operative to send the reference signal on the at least one radio resource indicated by the SL control information to enable the further radio device to estimate a quality of a radio channel between the further radio device and the radio device based on the reference signal. Further, the memory contains instructions executable by said at least one processor, whereby the radio device is operative to receive an SL radio transmission from the further radio device, the SL radio transmission being controlled based on the quality of the radio channel estimated by the further radio device. Alternatively or in addition, the memory contains instructions executable by said at least one processor, whereby the radio device is operative to receive a report of the estimated quality of the radio channel from the further radio device and control an SL radio transmission from the radio device to the further radio device based on the estimated quality of the radio channel.

According to a further embodiment, a radio device for a wireless communication network is provided. The radio device is configured to receive SL control information from a further radio device. The SL control information indicates at least one radio resource for transmission of a reference signal from the further radio device. Further, the radio device is configured to forward the received SL control information to one or more other radio devices.

According to a further embodiment, a radio device for a wireless communication network is provided. The radio device comprises at least one processor and a memory containing instructions executable by said at least one processor, whereby the radio device is operative to receive SL control information from a further radio device. The SL control information indicates at least one radio resource for transmission of a reference signal from the further radio device. Further, the memory contains instructions executable by said at least one processor, whereby the radio device is operative to forward the received SL control information to one or more other radio devices.

According to a further embodiment, a radio device for a wireless communication network is provided. The radio device is configured to determine, based on negotiation with a further radio device, at least one first radio resource for sending first SL control information by the further radio device. The SL control information indicates at least one second radio resource for transmission of a reference signal from the further radio device. Further, the radio device is configured to send second SL control information on the indicated at least one first radio resource to one or more other radio devices. The second SL control information indicates the at least one second radio resource to the one or more other radio devices.

According to a further embodiment, a radio device for a wireless communication network is provided. The radio device comprises at least one processor and a memory containing instructions executable by said at least one processor, whereby the radio device is operative to determine, based on negotiation with a further radio device, at least one first radio resource for sending first SL control information by the further radio device. The SL control information indicates at least one second radio resource for transmission of a reference signal from the further radio device. Further, the memory contains instructions executable by said at least one processor, whereby the radio device is operative to send second SL control information on the indicated at least one first radio resource to one or more other radio devices. The second SL control information indicates the at least one second radio resource to the one or more other radio devices.

According to a further embodiment, a radio device for a wireless communication network is provided. The radio device is configured to send SL radio transmissions and reference signals on at least one radio resource which is further being utilized for SL radio transmissions and transmissions of reference signals by at least one other radio device. Further, the radio device is configured to configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device.

According to a further embodiment, a system is provided. The system comprises a first radio device and a second radio device. The first radio device is configured to send SL control information to the second radio device, the SL control information indicating at least one radio resource for transmission of a reference signal from the first radio device; send the reference signal on the radio resources indicated by the SL control information; and receive a SL radio transmission from the second radio device. The second radio device is configured to receive the SL control information from the first radio device; receive the reference signal on the at least one radio resource indicated by the SL control information; based on the received reference signal, estimate quality of a radio channel between the first radio device and the second radio device; and based on the estimated quality of the radio channel, control the SL radio transmission from the second radio device to the first radio device.

According to a further embodiment, a system is provided. The system comprises a first radio device and a second radio device. The first radio device is configured to send SL control information to the second radio device, the SL control information indicating at least one radio resource for transmission of a reference signal from the first radio device; send the reference signal on the radio resources indicated by the SL control information; receive a report of an estimated quality of the radio channel from the second radio device; and control an SL radio transmission from the first radio device to the second radio device based on the estimated quality of the radio channel. The second radio device is configured to receive the SL control information from the first radio device; receive the reference signal on the at least one radio resource indicated by the SL control information; based on the received reference signal, estimate quality of a radio channel between the first radio device and the second radio device; and send the report of the estimated quality of the radio channel to the first radio device.

According to a further embodiment, a radio device for a wireless communication network is provided. The radio device comprises at least one processor and a memory containing instructions executable by said at least one processor, whereby the radio device is operative to send SL radio transmissions and reference signals on at least one radio resource which is further being utilized for SL radio transmissions and transmissions of reference signals by at least one other radio device. Further, the memory contains instructions executable by said at least one processor, whereby the radio device is operative to configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device.

According to a further embodiment, a node for a wireless communication network is provided. The node is configured to provide control information to multiple radio devices utilizing at least one radio resource for SL radio transmissions and transmissions of reference signals. The control information configures a time interval between an instance of transmission of the reference signals and a subsequent instance of transmission of the SL radio transmissions to be the same for each of the multiple radio devices.

According to a further embodiment, a node for a wireless communication network is provided. The node comprises at least one processor and a memory containing instructions executable by said at least one processor, whereby the node is operative to provide control information to multiple radio devices utilizing at least one radio resource for SL radio transmissions and transmissions of reference signals. The control information configures a time interval between an instance of transmission of the reference signals and a subsequent instance of transmission of the SL radio transmissions to be the same for each of the multiple radio devices.

According to a further embodiment, a system is provided. The system comprises multiple radio devices. Each of the multiple radio devices is configured to send SL radio transmissions and reference signals on at least one radio resource; and configure a time interval between an instance of transmission of the reference signals by the radio device and a subsequent instance of transmission of the SL radio transmissions by the radio device to be the same as a time interval between an instance of transmission of the reference signals by each other of the multiple radio devices and a subsequent instance of transmission of the SL radio transmissions by this other radio device. The system may further comprise a node of a wireless communication network. The node may be configured to provide control information for configuring the time interval to the multiple radio devices.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to receive SL control information from a further radio device. The SL control information indicates at least one radio resource for transmission of a reference signal from the further radio device. Further, execution of the program code causes the radio device to receive the reference signal on the at least one radio resource indicated by the SL control information. Further, execution of the program code causes the radio device to estimate, based on the received reference signal, quality of a radio channel between the radio device and the further radio device. Further, execution of the program code causes the radio device to control, based on the estimated quality of the radio channel, an SL radio transmission from the radio device to the further radio device. Alternatively or in addition, execution of the program code causes the radio device to send a report of the estimated quality of the radio channel to the further radio device.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to send SL control information to a further radio device. The SL control information indicates at least one radio resource for transmission of a reference signal from the radio device. Further, execution of the program code causes the radio device to send the reference signal on the at least one radio resource indicated by the SL control information to enable the further radio device to estimate a quality of a radio channel between the further radio device and the radio device based on the reference signal. Further, execution of the program code causes the radio device to receive an SL radio transmission from the further radio device, the SL radio transmission being controlled based on the quality of the radio channel estimated by the further radio device. Alternatively or in addition, execution of the program code causes the radio device to receive a report of the estimated quality of the radio channel from the further radio device and control an SL radio transmission from the radio device to the further radio device based on the estimated quality of the radio channel.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to receive SL control information from a further radio device. The SL control information indicates at least one radio resource for transmission of a reference signal from the further radio device. Further, execution of the program code causes the radio device to forward the received SL control information to one or more other radio devices.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to determine, based on negotiation with a further radio device, at least one first radio resource for sending first SL control information by the further radio device. The SL control information indicates at least one second radio resource for transmission of a reference signal from the further radio device. Further, execution of the program code causes the radio device to send second SL control information on the indicated at least one first radio resource to one or more other radio devices. The second SL control information indicates the at least one second radio resource to the one or more other radio devices.

According to a further embodiment of the invention, a computer program or computer program product is provided, e.g., in the form of a non-transitory storage medium, which comprises program code to be executed by at least one processor of a radio device for a wireless communication network. Execution of the program code causes the radio device to send SL radio transmissions and reference signals on at least one radio resource which is further being utilized for SL radio transmissions and transmissions of reference signals by at least one other radio device. Further, execution of the program code causes the radio device to configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device.

According to a further embodiment of the invention, a computer program or computer program product is provided, e.g., in the form of a non-transitory storage medium, which comprises program code to be executed by at least one processor of a node for a wireless communication network. Execution of the program code causes the node to provide control information to multiple radio devices utilizing at least one radio resource for SL radio transmissions and transmissions of reference signals. The control information configures a time interval between an instance of transmission of the reference signals and a subsequent instance of transmission of the SL radio transmissions to be the same for each of the multiple radio devices.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of SL radio transmissions in a wireless communication network. In the illustrated examples, it is assumed that the wireless communication network is based on the LTE radio technology or the NR radio technology without limiting the applicability to those technologies. The SL radio transmissions may thus be based on OFDM (Orthogonal Frequency Division Multiplexing). In the time domain, the SL radio transmissions are assumed to be organized in time slots referred to as subframes.

Figure 1:
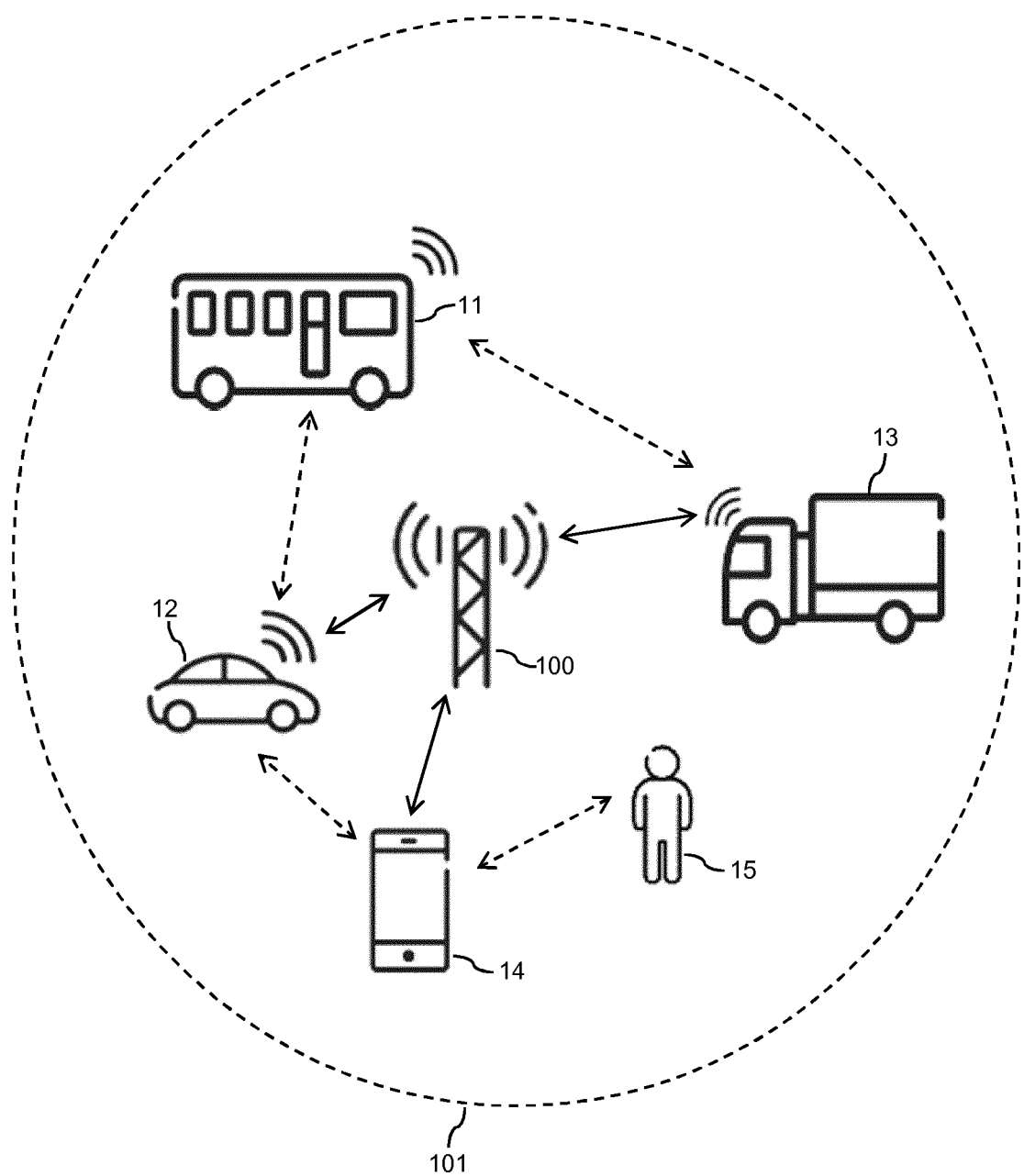
FIG. 1 shows an exemplary scenario for illustrating radio transmissions in a wireless communication network according to an embodiment of the invention.

FIG. 1 illustrates an exemplary scenario involving SL radio transmissions. More specifically, FIG. 1 shows an access node 100 of the wireless communication network, in the LTE radio technology referred to as eNB, and various entities 11, 12, 13, 14, 15 which may communicate by using DL radio transmissions and/or UL radio transmissions, illustrated by solid arrows, and SL radio transmissions, illustrated by broken arrows. A service area, or cell, of the access node is schematically illustrated by 101. The service area 101 may be defined by a radio coverage area in which DL radio transmissions from the access node 100 and UL radio transmissions to the access node 100 are possible. Here, it is noted that the wireless communication network may comprise further access nodes, each having a corresponding service area which may be overlapping or non-overlapping with the coverage area 101 of the access node 100.

The entities illustrated in FIG. 1 comprise vehicles 11, 12, 13, a mobile phone 14, and a person 15, e.g., a pedestrian, a cyclist, a driver of a vehicle, or a passenger of a vehicle. Here, it is noted that in the case of the vehicles 11, 12, 13 the radio transmissions may be performed by a communication module installed in the vehicle, and that in the case of the person 15 the radio transmissions may be performed by a radio device carried or worn by the person 15, e.g., a wristband device or similar wearable device. Those devices and modules may be also referred as UEs. The SL radio transmissions may be enabled by the DL radio transmissions and/or UL radio transmissions, e.g., by using DL radio transmissions from the access node 100 to control or otherwise manage the SL radio transmissions. Furthermore, it is noted that the entities shown in FIG. 1 are merely exemplary. The SL radio transmissions may be used for implementing various kinds of V2X communication, including V2V communication, V2P communication and/or V2I communication. Accordingly, the SL radio transmissions may carry various types of V2X messages, e.g., a cooperative awareness message (CAM) or a decentralized environmental notification message (DENM). However, other kinds of SL radio communication could be supported as well.

In some scenarios, the allocation of radio resources for a SL radio transmission may be performed in a centralized manner, using DL control information (DCI) which the access node 100 transmits to the radio device sending and/or receiving the SL radio transmission. In particular, for a certain SL radio transmission, the access node 100 may send DCI indicating allocated radio resources of an SL control channel to be used for transmission of SCI, and allocated radio resources of an SL data channel to be used for sending the actual data transmission.

Further, the allocation of radio resources for a SL radio transmission may be performed in a distributed or autonomous manner. In this case the sending radio device uses a specified algorithm to autonomously determine which radio resources to use for the SL radio transmission, for both the SL control channel and the SL data channel. The allocation of the radio resources may also be based on channel sensing performed by the sending radio device, e.g., in order to avoid collisions or other conflicts arising from multiple radio devices attempting to use the same radio resources. The autonomously allocated radio resources may be selected from one or more resource pools. The resource pool(s) may be preconfigured, e.g., based on a standard, or signaled by the network, e.g., using system information or higher layer signaling, e.g., RRC signaling. The sensing-based autonomous allocation of the radio resources may for example be performed in a similar manner as in "Mode 4" of LTE SL radio transmission as specified in 3GPP TS 36.213 V14.5.0 (2017-12). In Mode 4, autonomous resource allocation makes combined use of two features: semi-persistent resource allocation and sensing-based resource allocation. The semi-persistent resource allocation involves allocation of the radio resources over an extended time interval, so that they can be re-used in a more or less regular manner. The sensing based allocation involves monitoring the radio channel to detect the presence of such regular transmissions by other devices. In this way, the UE can avoid collisions when autonomously selecting the radio resources from a resource pool shared by multiple radio devices.

The resource allocation for LTE SL transmission was designed targeting broadcast transmission modes. However, future enhancements, e.g., to be introduced for the NR radio technology, are expected to also support unicast transmission modes. Providing unicast transmissions with high throughput, spectral efficiency, or reliability may require some dedicated layer 1 (L1) control signaling between two UEs participating in the SL radio transmissions, e.g., UEs paired for unicast SL radio transmissions. Examples of such L1 control signaling include channel state information (CSI) reporting and/or positive or negative acknowledgment (ACK/NACK) feedback for data transmissions.

According to concepts as further detailed below, a framework is provided to support CSI related control signaling for SL radio transmissions, in particular SCSI-RS (SL CSI reference signal) transmissions and/or SCSI (SL CSI) reports. The illustrated framework may also support coexistence of unicast mode SL radio transmissions with broadcast mode SL radio transmissions on the same set of resources. The SCSI-RS may be used as a basis for estimating SCSI, i.e., quality of a radio channel between the UEs participating in the SL radio transmissions. Further, the SCSI-RS may be used as a basis for interference estimation. As further detailed below, the framework may provide signaling and resource allocation procedures that support the SCSI-RS transmissions between the UEs. These procedures may also avoid inaccuracy in SCSI estimation due to hidden UEs. Further, in some scenarios the procedures may also avoid inconsistencies in SCSI estimation due to time variation of channel conditions and/or interference levels.

In the illustrated concepts, the SCSI-RS may be used in the following way: A first UE sends the SCSI-RS. The SCSI-RS is transmitted on a set of predefines resources and has predefined characteristics. The SCSI-RS may be transmitted according to a periodic schedule. However, aperiodic transmission of the SCSI-RS, e.g., triggered by a need to perform an SL radio transmission, could be used as well. A second UE receives the SCSI-RS and estimates the SCSI from the received SCSI. The second UE then reports the estimated SCSI to the first UE to adapt transmission parameters of an SL radio transmission from the first UE to the second UE, e.g., in view of higher throughput, higher transmission reliability, and/or increased spectral efficiency. Further, the estimated SCSI could also be utilized in a reciprocity-based scheme. In this case, the second UE could use the SCSI to adapt transmission parameters of an SL radio transmission from the second UE to the first UE.

The SCSI-RS could be transmitted on fixed time resources, e.g., in the n-th symbol of a subframe and using a fixed frequency allocation, e.g., on the whole system bandwidth supported for SL radio transmission. However, such fixed allocation of radio resources for the SCSI-RS may be problematic due to the following reasons: (1) In typical scenarios the UE is power limited which means transmitting SCSI-RS over the whole SL system bandwidth may result in poor channel estimation due to low transmission power spectral density. (2) Since all the UEs, no matter whether they operate in unicast or broadcast mode, may have to avoid using the radio resources allocated for the SCSI-RS in order to avoid RS contamination, spectral efficiency and/or reduced transmission reliability for safety critical applications may be adversely affected in the case of co-existing broadcast mode and unicast mode SL radio transmissions. Accordingly, the illustrated framework supports dynamically scheduling the SCSI-RS transmissions by a scheduling assignment (SA) transmitted with SL control information (SCI), in the following also referred to as SCSI-RS SA. In this case, an SCSI-RS transmission has an associated SCI transmission which controls the SCSI-RS and includes an SCSI-RS SA that indicates the radio resource(s) that will be used for the SCSI-RS transmission. The SCI with the SCSI-RS SA informs potential receivers about the intended SCSI-RS transmission. The SCI may also include other information, e.g., information identifying the transmitter of the SCSI-RS, information identifying an intended receiver of the SCSI-RS, information indicating a priority associated with the SCSI-RS transmission, information identifying an application associated with the SCSI-RS transmission, or the like.

Accordingly, in the illustrated framework the radio resource(s), e.g., time and/or frequency resources, used for the SCSI-RS transmission may be indicated in the associated SCI. For example, the SCI may indicate the time location, e.g., n-th symbol within the subframe, and/or frequency position, e.g., in terms of one or more resource blocks (RBs) or subchannels. Further, the SCI could indicate a symbol sequence used for the SCSI-RS transmission. In this way, the SCSI-RS transmission may be controlled in a flexible manner. In some cases, the SCSI-RS may be transmitted on the same frequency resources that the transmitting UE also intends to use for the SL radio transmission. In other cases, the frequency resources may be selected independently of the frequency resources that the transmitting UE also intends to use for the SL radio transmission.

Figure 2:
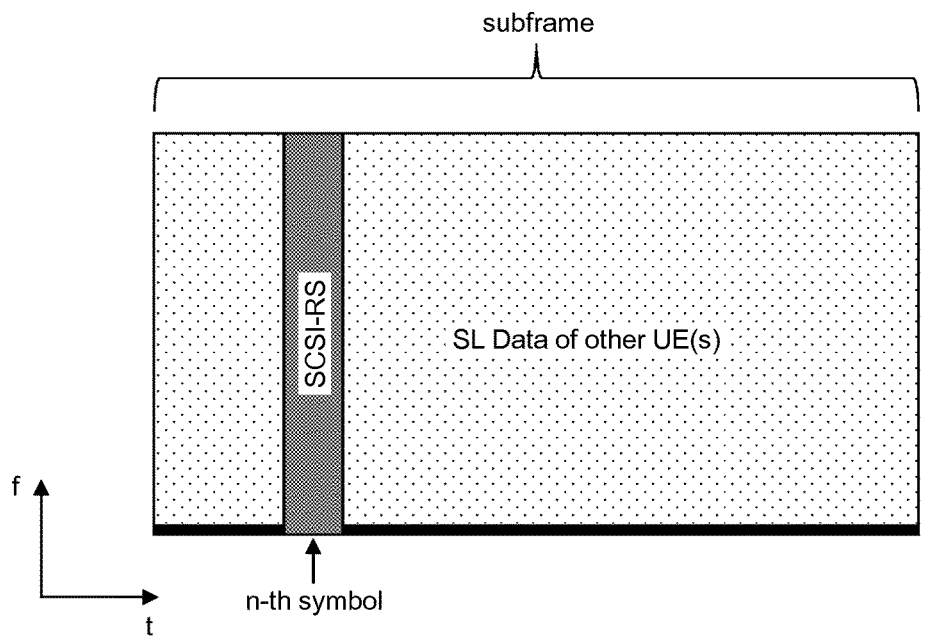
FIG. 2 illustrates an example of coordinating transmission of an SL reference signal by one UE with transmission of SL data by one or more other UEs according to an embodiment of the invention.

Further, the reception of the SCI associated with a SCSI-RS transmission informs the receiving UE about the SCSI-RS transmission. In this way, the receiving UE can adaptively make use of the resources. For example, if the SCI schedules a SCSI-RS transmission on certain radio resources, the receiving UE may avoid transmitting on these radio resources. This may involve that the receiving UE punctures its own transmission at the scheduled radio resources and/or rate-matches its own transmission around the scheduled radio resources. FIG. 2 illustrates a corresponding example in which one UE sends an SCSI-RS on certain radio resources of a subframe and one or more other UEs use the remaining radio resources of the subframe for transmitting SL data. In the example of FIG. 2, the SCI-RS is transmitted in the n-th symbol of the subframe, using the whole SL system bandwidth. The symbol position and/or the utilized bandwidth may be indicated in the SCI associated with the SCSI-RS transmission. In scenarios where a UE does not receive an SCSI-RS SA for a subframe, it can use all radio resources of the subframe for its own transmissions. Accordingly, by dynamically scheduling the SCSI-RS transmissions, radio resources can be used in a highly efficient manner.

Figure 3:
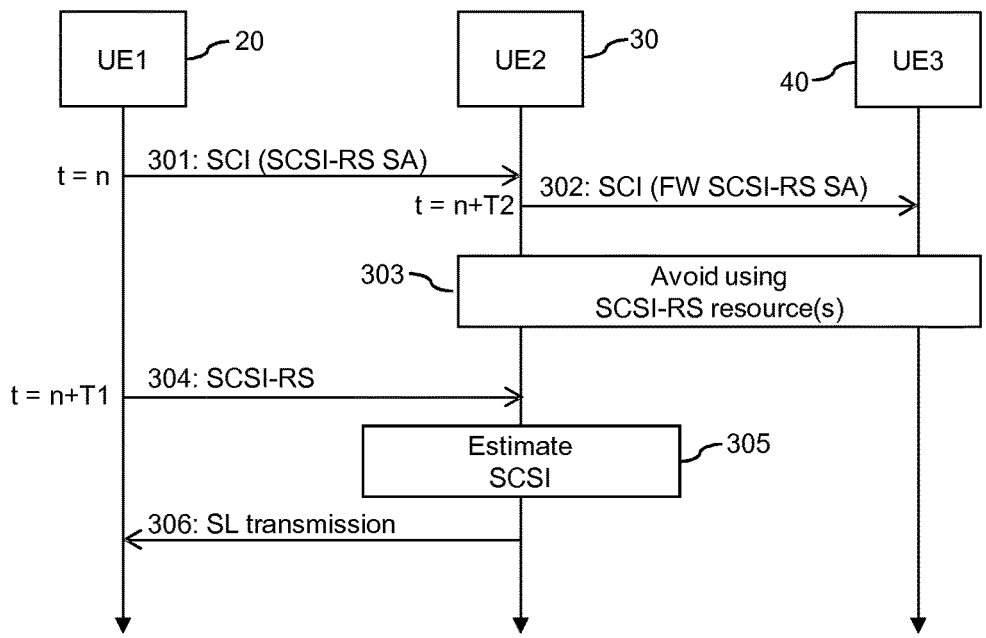
FIG. 3 illustrates an example of processes for SL reference signal based control of an SL radio transmission according to an embodiment of the invention.

FIG. 3 shows an example of processes in which a SL radio transmission is controlled based on the principles as outlined above. The processes of FIG. 3 involve a first UE 20 (UE1), a second UE 30 (UE2), and a third UE 40 (UE3). Here, it is noted that the UEs 20, 30, 40 could correspond to any combination of the entities 11, 12, 13, 14, 15 illustrated in FIG. 1. In the processes of FIG. 3, it is assumed that the SL radio transmission is performed in a unicast mode from the second UE 30 to the first UE 20. For example, the first UE 20 and the second UE 30 may be paired for unidirectional or bidirectional unicast mode SL radio transmissions.

The SL radio transmission may also be based on beamforming techniques, using multiple antennas at the first UE 20 and/or at the second UE 30. The third UE 40 is assumed to not participate in the SL radio transmissions between the first UE 20 and the second UE 30, but constitutes a potential source of disturbances for the SL radio transmissions. For example, from the perspective of the first UE 20, the third UE 40 could constitute a hidden node.

In the processes of FIG. 3, the first UE 20 transmits SCI 301. The SCI 301 may be transmitted in a broadcast mode. Accordingly, the SCI 301 may be receivable by a plurality of UEs, including the second UE 30. In the scenario of FIG. 3 it is further assumed that the third UE 40 is outside the coverage of the first UE 20. Accordingly, the SCI 301 is received by the second UE 30, but not by the third UE 40.

The SCI 301 includes an SCSI-RS SA which indicates one or more radio resources for transmission of an SCSI-RS by the first UE 20. The SCSI-RS SA may for example indicate the radio resource(s) in terms of time and/or frequency position, e.g., RB(s), subframe, symbol position, and/or frequency subchannel. Further, the SCI 301 may also indicate a symbol sequence of the SCSI-RS, the transmitter of the SCSI-RS, i.e., the first UE 20, the intended receiver of the SCSI-RS, i.e., the second UE 30, a priority associated with the SCSI-RS transmission, and/or an application associated with the SCSI-RS transmission. In the example of FIG. 3, the first UE 20 sends the SCI 301 with the SCSI-RS SA at t=n and the SCSI-RS SA schedules the SCSI-RS transmission for t=n+T1.

As further illustrated, the second UE 30 may also send SCI 302 in order to forward the SCSI-RS SA received with the SCI 301. Since the third UE 40 is assumed to be within the coverage of the second UE 30, the SCSI-RS SA can thus also be received by the third UE 40. The SCI 302 sent by the second UE 30 can include the same information as the SCI 301. Accordingly, the SCI 302 can indicate a symbol sequence of the SCSI-RS, the transmitter of the SCSI-RS, i.e., the first UE 20, the intended receiver of the SCSI-RS, i.e., the second UE 30, a priority associated with the SCSI-RS transmission, and/or an application associated with the SCSI-RS transmission. In the example of FIG. 3, the second UE 30 decodes the SCSI-RS SA and forwards the SCSI-RS SA at time t=n+T2 with the SCI 302, where T2<T1.

As illustrated by block 303, in response to receiving the SCSI-RS SA and optional additional information conveyed together with the SCSI-RS SA the second UE 30 and the third UE 40 may avoid using the radio resource(s) indicated by the SCSI-RS SA, i.e., exclude the indicated radio resource(s) from being used for an own SL radio transmission or other radio transmission. As explained in connection with FIG. 2, this may involve puncturing the own radio transmission at the indicated radio resource(s) and/or rate matching the own radio transmission around the indicated radio resource(s).

The first UE 20 then sends the SCSI-RS 304 on the indicated radio resource(s), at time t=n+T1. The SCSI-RS 304 is received by the second UE 30. Since both the second UE 30 and the third UE 40 may avoid transmitting on the indicated radio resources, contamination of the transmitted SCSI-RS can be avoided.

As indicated by block 305, the second UE 30 uses the received SCSI-RS for estimating the SCSI for the radio channel between the first UE 20 and the second UE 30. The SCSI may for example be estimated in terms of a channel coefficient, a matrix of channel coefficients, and/or one or more CQIs (channel quality indicators) and/or PMI (precoding matrix indicator).

In the processes of FIG. 3, the second UE 30 then performs the SL radio transmission 306 to the first UE 20. The second UE 30 controls the SL radio transmission 306 based on the estimated SCSI, e.g., by adaptation of one or more transmission parameters like MCS (modulation and coding scheme), transmit power, or the like. If the SL radio transmission 306 uses beamforming, a beamforming configuration or precoding vector may be selected based on the SCSI indicated by the SCSI report 406, e.g., based on an SVD (singular value decomposition) of a matrix of channel coefficients. Accordingly, the SL radio transmission 306 is controlled using a reciprocity-based scheme, assuming that the SCSI estimated based on the SCSI-RS transmitted from the first UE 20 to the second UE 30 is also applicable for the opposite transmission direction, from the second UE 30 to the first UE 20.

Figure 4:
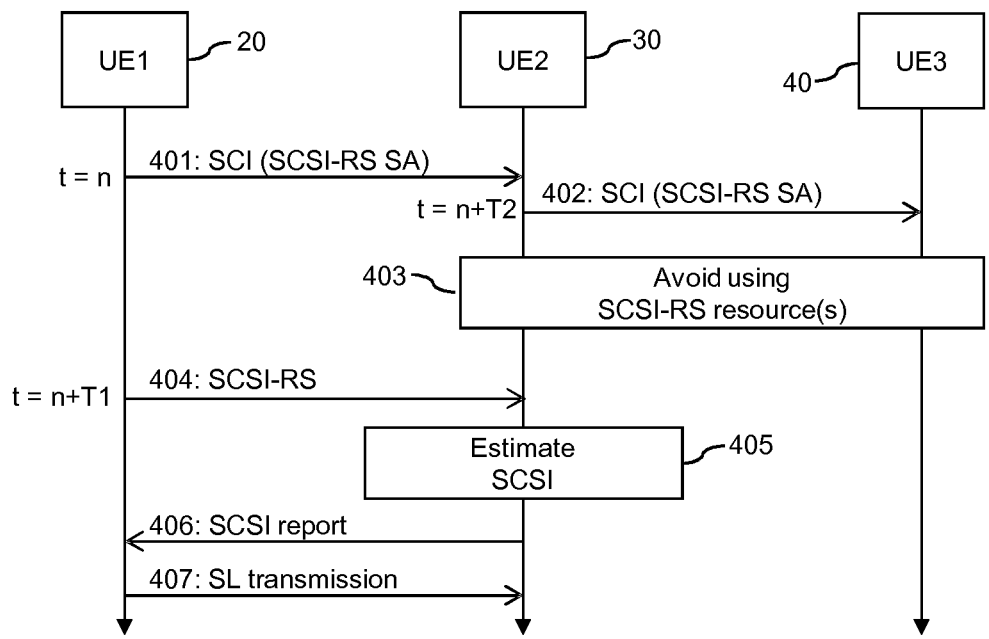
FIG. 4 illustrates a further example of processes for SL reference signal based control of an SL radio transmission according to an embodiment of the invention.

FIG. 4 shows a further example of processes in which a SL radio transmission is controlled based on the principles as outlined above. The processes of FIG. 4 involve a first UE 20 (UE1), a second UE 30 (UE2), and a third UE 40 (UE3). Here, it is noted that the UEs 20, 30, 40 could correspond to any combination of the entities 11, 12, 13, 14, 15 illustrated in FIG. 1. In the processes of FIG. 4, it is assumed that the SL radio transmission is performed in a unicast mode from the first UE 20 to the second UE 20. For example, the first UE 20 and the second UE 30 may be paired for unidirectional or bidirectional unicast mode SL radio transmissions. The SL radio transmission may also be based on beamforming techniques, using multiple antennas at the first UE 20 and/or at the second UE 30. The third UE 40 is assumed to not participate in the SL radio transmissions between the first UE 20 and the second UE 30, but constitutes a potential source of disturbances for the SL radio transmissions. For example, from the perspective of the first UE 20, the third UE 40 could constitute a hidden node.

In the processes of FIG. 4, the first UE 20 transmits SCI 401. The SCI 401 may be transmitted in a broadcast mode. Accordingly, the SCI 401 may be receivable by a plurality of UEs, including the second UE 30. In the scenario of FIG. 4 it is further assumed that the third UE 40 is outside the coverage of the first UE 20. Accordingly, the SCI 401 is received by the second UE 30, but not by the third UE 40.

The SCI 401 includes an SCSI-RS SA which indicates one or more radio resources for transmission of an SCSI-RS by the first UE 20. The SCSI-RS SA may for example indicate the radio resource(s) in terms of time and/or frequency position, e.g., RB(s), subframe, symbol position, and/or frequency subchannel. Further, the SCI 401 may also indicate a symbol sequence of the SCSI-RS, the transmitter of the SCSI-RS, i.e., the first UE 20, the intended receiver of the SCSI-RS, i.e., the second UE 30, a priority associated with the SCSI-RS transmission, and/or an application associated with the SCSI-RS transmission. In the example of FIG. 4, the first UE 20 sends the SCI 401 with the SCSI-RS SA at t=n and the SCSI-RS SA schedules the SCSI-RS transmission for t=n+T1.

As further illustrated, the second UE 30 may also send SCI 402 in order to forward the SCSI-RS SA received with the SCI 401. Since the third UE 40 is assumed to be within the coverage of the second UE 30, the SCSI-RS SA can thus also be received by the third UE 40. The SCI 402 sent by the second UE 30 can include the same information as the SCI 401. Accordingly, the SCI 402 can indicate a symbol sequence of the SCSI-RS, the transmitter of the SCSI-RS, i.e., the first UE 20, the intended receiver of the SCSI-RS, i.e., the second UE 30, a priority associated with the SCSI-RS transmission, and/or an application associated with the SCSI-RS transmission. In the example of FIG. 4, the second UE 30 decodes the SCSI-RS SA and forwards the SCSI-RS SA at time t=n+T2 with the SCI 402, where T2<T1.

As illustrated by block 403, in response to receiving the SCSI-RS SA and optional additional information conveyed together with the SCSI-RS SA the second UE 30 and the third UE 40 may avoid using the radio resource(s) indicated by the SCSI-RS SA, i.e., exclude the indicated radio resource(s) from being used for an own SL radio transmission or other radio transmission. As explained in connection with FIG. 2, this may involve puncturing the own radio transmission at the indicated radio resource(s) and/or rate matching the own radio transmission around the indicated radio resource(s).

The first UE 20 then sends the SCSI-RS 404 on the indicated radio resource(s), at time t=n+T1. The SCSI-RS 404 is received by the second UE 30. Since both the second UE 30 and the third UE 40 may avoid transmitting on the indicated radio resources, contamination of the transmitted SCSI-RS can be avoided.

As indicated by block 405, the second UE 30 uses the received SCSI-RS for estimating the SCSI for the radio channel between the first UE 20 and the second UE 30. The SCSI may for example be estimated in terms of a channel coefficient, a matrix of channel coefficients, and/or one or more CQIs and/or PMI. Based on the estimated SCSI, the second UE 30 then sends an SCSI report 406 to the first UE 20. The SCSI report 406 indicates the estimated SCSI.

The first UE 20 receives the SCSI report 406 and then performs the SL radio transmission 407 to the second UE 30. The first UE 20 controls the SL radio transmission 407 based on the SCSI indicated by the SCSI report 406, e.g., by adaptation of one or more transmission parameters like MCS, transmit power, or the like. If the SL radio transmission 407 uses beamforming, a beamforming configuration or precoding vector may be selected based on the SCSI indicated by the SCSI report 406, e.g., based on an SVD of a matrix of channel coefficients.

In the processes of FIGS. 3 and 4, the hidden node problem due to the presence of the third UE 40 is resolved by the forwarding of the SCSI-RS SA and the optional additional conveyed together with the SCSI-RS SA. In some scenarios, the second UE 30 could decide whether to forward the received SCSI-RS SA. For example, such decision could be based on a rule considering a battery power level of the second UE 30. For example, if the remaining battery power of the second UE 30 is below a certain threshold, the second UE 30 may decide not to forward the received SCSI-RS SA. Other criteria which may be considered alternatively or additionally by such rule include congestion level of the radio resources for sending of the SCI, a priority of the SL radio transmission by the first UE 20 or the second UE 30, a type of traffic of the SL radio transmission or the application generating the SL radio transmission, a latency requirement of the SL radio transmission by the first UE 20 or the second UE 30, a reliability requirement of the SL radio transmission by the first UE 20 or the second UE 30, or the like. In some scenarios the decision whether to forward the SCSI-RS may also be based on a request from the first UE 20. For example, the second UE 30 could forward the received SCSI-RS SA in response to receiving a "forward SCSI-RS SA" request from the first UE 20, e.g., as additional information conveyed in the SCI together with the SCSI-RS SA. According to a further example, the second UE 30 could forward the received SCSI-RS SA in response to not receiving a "do not forward SCSI-RS SA" from the first UE 20, e.g., as additional information conveyed in the SCI together with the SCSI-RS SA.

In the following, we describe two different step-wise procedures to enable the above described method. It may be seen as two sub-embodiments of the main method.

In some scenarios, time and/or frequency resources for sending the SCI conveying the SCSI-RS SA may be pre-configured, e.g., be located in a preconfigured control region. For instance, the UEs 20, 30, 40 could be preconfigured to define that the SCI-RS SA shall be transmitted in the first symbol of each subframe. This may impose certain limitations on the forwarding of the SCSI-RS SA by the second UE 30. For example, after the second UE 30 received the SCSI-RS SA it may need to wait until the preconfigured control region of the next subframe. In the above examples, this puts a constraint on T2 and T1. In particular, this may result in T1 being at least two subframes and T2<T1. In case of periodic SCSI-RS transmissions, it is also possible to allow the first SCSI-RS transmission to forwards the SCSI-RS SA for the next periodic SCSI-RS transmission occasion. In this case, the SCI with the SCSI-RS and the SCSI-RS could also be transmitted in the same subframe.

Figure 5:
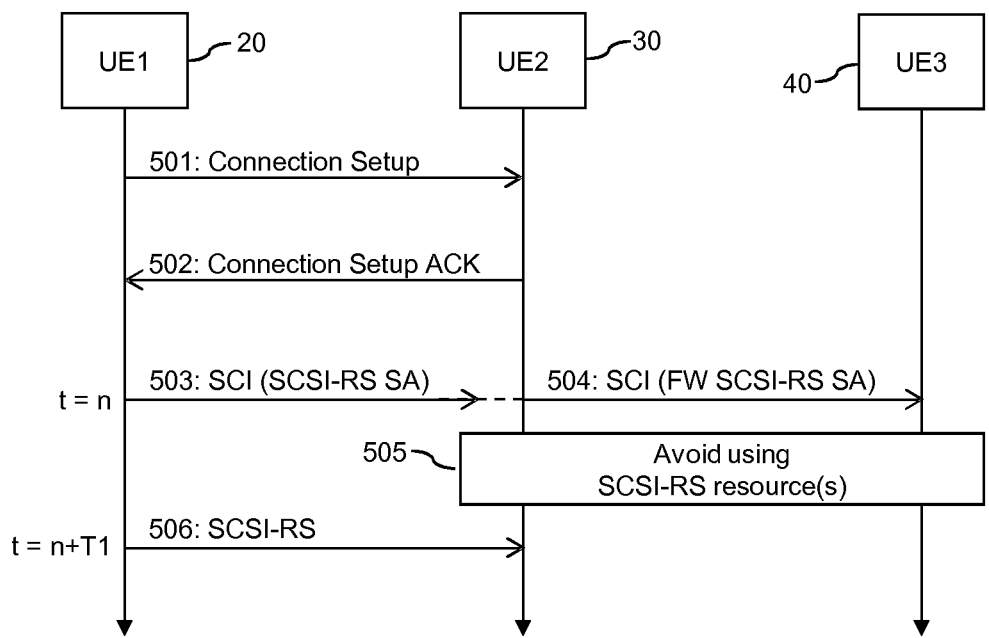
FIG. 5 illustrates an example of configuring SL reference signal transmission according to an embodiment of the invention.

In some scenarios, information concerning the scheduled SCSI-RS transmission may also be propagated based on negotiation between two or more UEs, without requiring that the SCI conveying the SCSI-RS SA is received and then forwarded. An example of corresponding processes is illustrated in FIG. 5. The processes of FIG. 5 involve a first UE 20 (UE1), a second UE 30 (UE2), and a third UE 40 (UE3). Here, it is noted that the UEs 20, 30, 40 could correspond to any combination of the entities 11, 12, 13, 14, 15 illustrated in FIG. 1.

In the example processes of FIG. 5, the first UE 20 and the second UE 30 perform a connection establishment procedure which involves that the first UE 20 sends a connection setup request message 501 to the second UE 30, to which the second UE 30 responds with a connection setup acknowledgement message 502. By exchanging information in the messages 501, 502, the first UE 20 and the second UE 30 agree that the first UE 20 will send an SCSI-RS at predefined time instances, e.g., every T seconds or every N subframes. A similar exchange of information could also be at any time after connection establishment, e.g., triggered each time when there is a need to perform an SL radio transmission. In some scenarios, such exchange of information may also occur in an implicit manner. For example, an SL radio transmission by the first UE 20 or by the second UE 30 could implicitly indicate that at t=n+T1 the SCSI-RS will be transmitted by the first UE 20. Accordingly, the first UE 20 and the second UE 30 may negotiate the radio resource(s) to be used by the first UE 20 for sending the SCSI-RS, and the second UE 30 may thus be informed about these resources already before it receives SCI with an SCSI-RS SA indicating the radio resource(s) from the first UE 20.

In the processes of FIG. 5 the first UE 20 and the second UE 30 negotiate at time t<n radio resources for sending the SCSI-RS and associated radio resources for sending the SCSI-RS SA for controlling the SCSI-RS. Specifically, the first UE 20 and the second UE 30 agree that the SCSI-RS SA will be sent at t=n and that the SCSI-RS will be sent at t=n+T1.

Accordingly, the first UE 20 sends SCI 503 with the SCSI-RS SA at t=n. At the same time, the second UE 30 sends SCI 504 with the SCSI-RS SA. Due to the negotiation this is possible without requiring that the second UE 30 receives the SCI 503 sent by the first UE 20. As illustrated by a dotted line extending the arrow representing the transmission of the SCI 503, the example of FIG. 5 in fact assumes that the SCI 503 is not received by the second UE 30. The SCI 504 sent by the second UE 30 is however received by the third UE 40.

In the example processes of FIG. 5 the transmissions of the SCI 503 and the SCI 504 are identical and may thus constructively combine, thereby enhancing reliability and coverage. Further, the SCI with the SCSI-RS SA and the SCSI-RS can be transmitted within the same subframe without incurring a delay associated with forwarding of the SCSI-RS SA. Still further, since the SCI 503 and the SCI 504 are sent on the same radio resources, the SCSI-RS SA can be propagated in a highly resource efficient manner. In the processes of FIG. 5, T1 may have a duration of a few symbols, which means that the SCSI-RS SA and the SCSI-RS can be transmitted in the same subframe. However, larger durations of T1, e.g., corresponding to one or more subframes, are possible as well.

As illustrated by block 505, the second UE 30 and the third UE 40 may avoid using the radio resource(s) indicated by the SCSI-RS SA, i.e., exclude the indicated radio resource(s) from being used for an own SL radio transmission or other radio transmission. As explained in connection with FIG. 2, this may involve puncturing the own radio transmission at the indicated radio resource(s) and/or rate matching the own radio transmission around the indicated radio resource(s).

The first UE 20 then sends the SCSI-RS 506 on the indicated radio resource(s), at time t=n+T1. Since the second UE 30 and the third UE 40 may avoid transmitting on the indicated radio resource(s), contamination of the SCSI-RS can be avoided.

As indicated, procedures as explained connection with the processes of FIGS. 3, 4, and 5 may help to avoid contamination of the SCSI-RS, e.g., due to interference from a hidden node or some other node. This may be specifically useful when using a reciprocity-based scheme for controlling the SL radio transmissions, because the interference conditions at the UE sending the SCSI-RS and the interference conditions at the UE receiving the SCSI-RS could be different.

As mentioned above, the radio resource(s) for transmitting the SCSI-RS SA may be preconfigured in the UEs 20, 30, 40, e.g., based on standardization, operator configuration, and/or manufacturer configuration. However, it is also possible that additionally or alternatively the radio resource(s) for transmitting the SCSI-RS SA is based on control information received by the UEs 20, 30, 40. Such control information could be provided by a node of the wireless communication network, e.g., by the above-mentioned access node 100. In addition or alternatively, such control information could be negotiated or otherwise exchanged among the UEs 20, 30, 40.

Figure 6A:
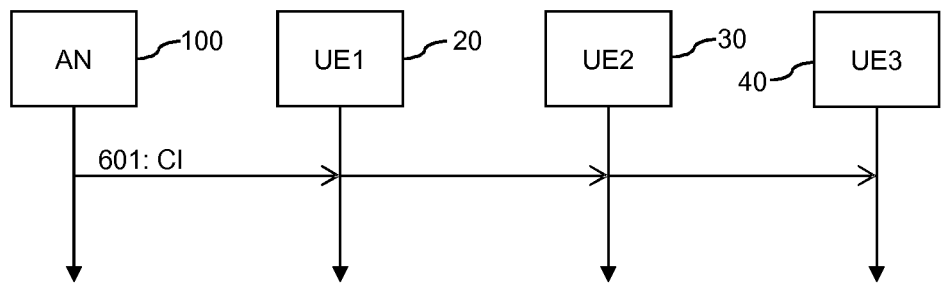
FIGS. 6A and 6B illustrates a further example of configuring SL reference signal transmission according to an embodiment of the invention.

FIG. 6A illustrates an example of processes which may be used for providing the UEs 20, 30, with control information for configuring the radio resource(s) to be used for transmitting the SCSI-RS SA. In the example of FIG. 6A, the access node 100 sends the control information 601 in a broadcast message which is receivable by multiple UEs in the coverage range of the access node, including the UEs 20, 30, 40. For example, the access node 100 could send the control information 601 in broadcasted system information. The control information 601 may indicate the radio resource(s) for transmitting the SCSI-RS SA in terms of time and/or frequency position, e.g., RB(s), subframe, symbol position, and/or frequency subchannel. In some scenarios, the control information 601 may also identify a preconfigured radio resource configuration. Accordingly, the control information 601 received by the UE 20, 30, 40 may also be used in combination with configuration information which is predefined in the UE 20, 30, 40, e.g., based on standardization, operator configuration, and/or manufacturer configuration.

Figure 6B:
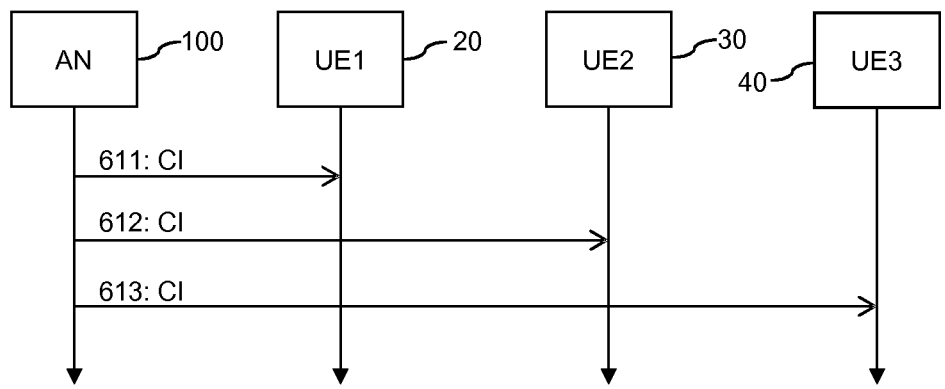

FIG. 6B illustrates a further example of processes which may be used for providing the UEs 20, 30, 40 with control information for configuring the radio resource(s) to be used for transmitting the SCSI-RS SA. In the example of FIG. 6B, the access node 100 sends control information 611 to the first UE 20, control information 612 to the second UE 30, and control information 613 to the third UE 40. The control information 611, 612, 613 may in each case be transmitted in a unicast message individually addressed to the respective UE 20, 30, 40. For example, the control information 611, 612, 613 could be conveyed in DCI to the respective UE 20, 30, 40. However, it also possible to used higher layer signalling, e.g., a message of a RRC (radio resource control) protocol. The control information may indicate the radio resource(s) for transmitting the SCSI-RS SA in terms of time and/or frequency position, e.g., RB(s), subframe, symbol position, and/or frequency subchannel. In some scenarios, the control information 611, 612, 613 may also identify a preconfigured radio resource configuration.

Accordingly, the control information 611, 612, 613 respectively received by the UE 20, 30, 40 may also be used in combination with configuration information which is predefined in the UE 20, 30, 40, e.g., based on standardization, operator configuration, and/or manufacturer configuration. Further, the control information 611, 612, 613 respectively received by the UE 20, 30, 40 may also be used in combination with other control information, e.g., control information provided in a broadcast message like in the processes of FIG. 6A. For example, the broadcast message could be used to predefine one or more radio resource configurations for transmission of the SCSI-RS SA, and the control information 611, 612, 613 could then identify the radio resource configuration to be applied by the UE 20, 30, 40, e.g., in terms of an index.

Figure 7:
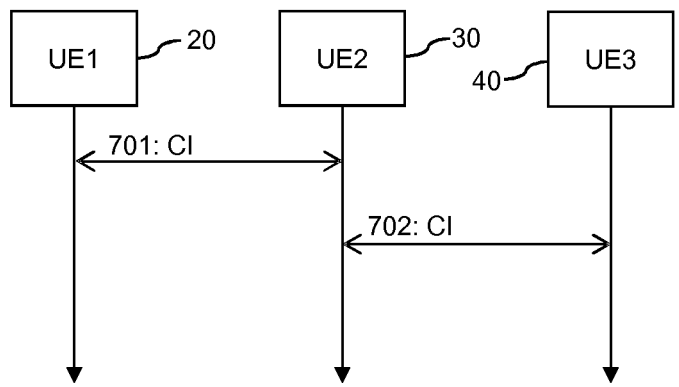
FIG. 7 illustrates a further example of configuring SL reference signal transmission according to an embodiment of the invention

FIG. 7 illustrates an example of processes which may be used for providing the UEs 20, 30, 40 with control information for configuring the radio resource(s) to be used for transmitting the SCSI-RS SA. In the example of FIG. 7, the UEs 20, 30, 40 negotiate or otherwise exchange control information among each other. In particular, the first UE 20 negotiates control information 701 with the second UE 30, and the second UE 30 negotiates control information 702 with the third UE 40. In this way, the radio resource(s) for transmitting the SCSI-RS SA may be coordinated among the UEs 20, 30, 40, without requiring assistance from a centralized node.

In the example of FIG. 7, the negotiation of the control information 701, 702 may involve bidirectional exchange of information among two UEs 20, 30, 40, e.g., as part of a handshake when the two UEs 20, 30, 40 enter each other's coverage areas. However, in some scenarios the negotiation could also be based on unidirectional transfer of information from one UE 20, 30, 40 to the other. For example, one UE 20, 30, 40 could send control information indicating the radio resource(s) to be used for transmitting the SCSI-RS SA, and then assume that the indicated configuration is accepted by the other UE 20, 30, 40, unless the other UE 20, 30, 40 sends a response indicating that the configuration is not accepted. The UEs 20, 30, 40 may use broadcast, multicast, or unicast messages for propagating the control information 701, 702 among each other. The control information 701, 702 may indicate the radio resource(s) for transmitting the SCSI-RS SA in terms of time and/or frequency position, e.g., RB(s), subframe, symbol position, and/or frequency subchannel. In some scenarios, the control information 701, 702 may also identify a preconfigured radio resource configuration. Accordingly, the negotiation of control information as used in the processes of FIG. 7 could also be combined with control information provided in a broadcast message like in the processes of FIG. 6A and/or with control information provided in a unicast message like in the processes of FIG. 6B. For example, one of the UEs 20, 30, 40 could receive the control information in a broadcast and/or unicast message from the access node 100 and then propagate the received information to another UE. Further, the broadcast message and/or unicast message could be used to predefine one or more radio resource configurations for transmission of the SCSI-RS SA, and the control information 701, 702 negotiated among the UEs 20, 30, 40 could then identify the radio resource configuration to be applied by the UE 20, 30, 40, e.g., in terms of an index.

In some scenarios, the transmission of the SCSI-RS and the subsequent SL radio transmission controlled based on the SCSI-RS are in different subframes. This may have the effect that channel conditions and/or interference levels due to overlapping transmissions in these subframes may be different. That is, the channel estimate in one subframe does not accurately reflect the actual channel conditions in another subframe. Accordingly, the estimate of channel quality or interference level may become inaccurate. This may for example be problematic in scenarios where the SL radio transmissions are controlled on the basis of reported SCSI, e.g., as in the processes of FIG. 4, because the reporting of SCSI introduces a delay between the SCSI-RS transmission used as the basis of the estimate and the SL radio transmission controlled based on the estimate. In other words, a UE measures CSI based on the received SCSI-RS and may report the measured PMI and/or CQI to the other UE. Later, this UE may use the reported PMI and/or CQI to control its SL radio transmission, e.g., by adapting MCS or transmit power and/or by selecting a beamforming or precoding configuration.

Figure 8:
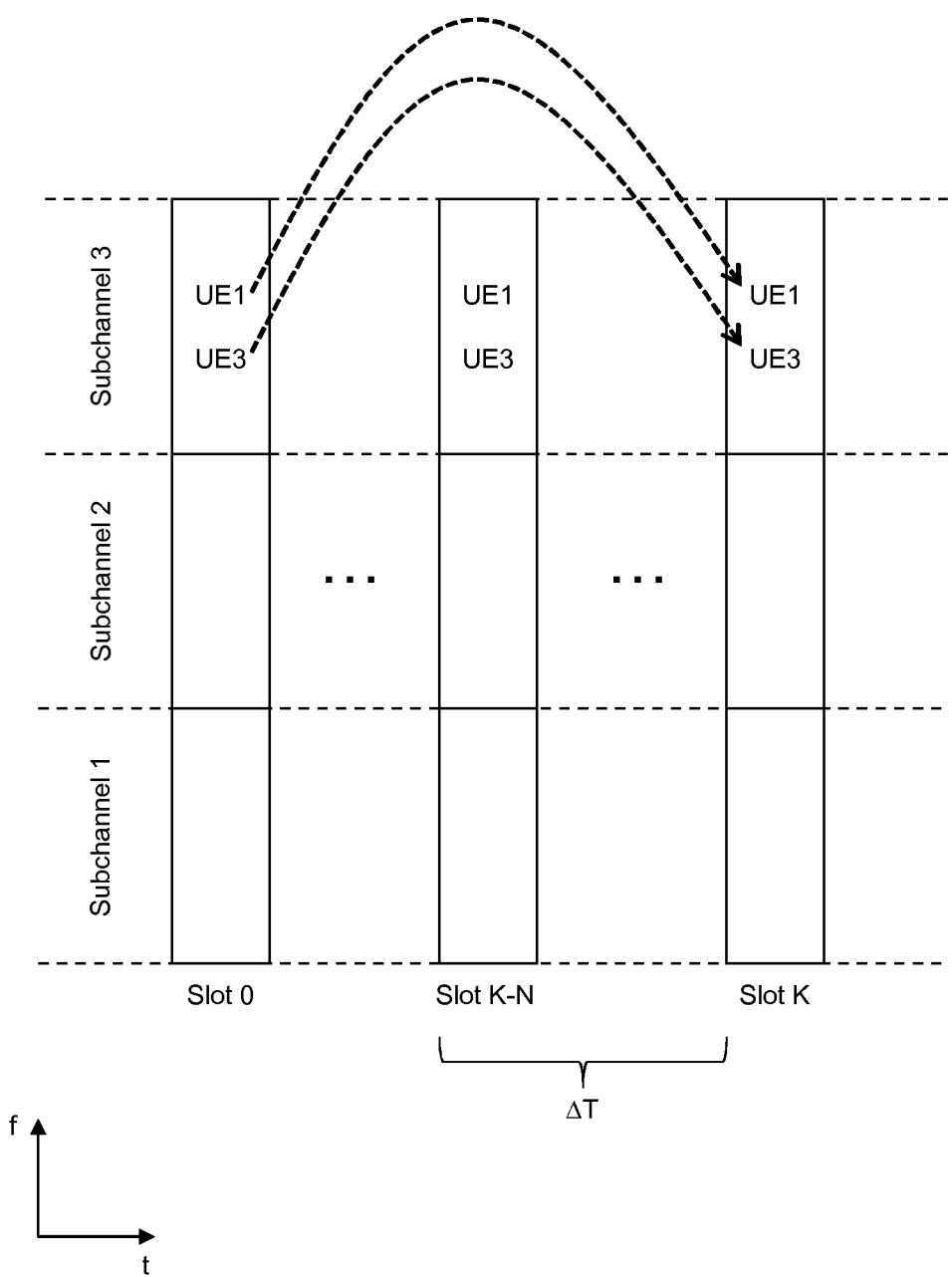
FIG. 8 illustrates an example of time-coordination of SL reference signals and transmissions of SL data by multiple UEs according to an embodiment of the invention.

In order to address the issue of variable interference levels affecting the accuracy of estimates obtained on the basis of the SCSI-RS, a relative timing of on the one hand SCSI-RS transmissions and on the other hand SL radio transmissions controlled on the basis of the SCSI-RS may be coordinated for multiple UEs transmitting on the same radio resource(s), e.g., the same resource pool or carrier. In particular, a time interval between the SCSI-RS transmission by the UE and the subsequent SL radio transmission by the UE may be configured to be the same for all the UEs which transmit on the same radio resource(s) and might interfere with each other. The time interval may for example correspond to a non-zero integer number of subframes. FIG. 8 illustrates a corresponding example of coordinating the relative timing of SCSI-RS transmissions and SL radio transmissions.

The example of FIG. 8 again assumes a scenario where the first UE 20 (UE1) and the second UE 30 (UE2) are within each other's coverage, but the third UE 40 (UE3) is hidden from the perspective of the first UE 20 and may thus interfere with SL radio transmissions by the first UE 20. The first UE 20 has selected or reserved one or more radio resource(s), e.g., in terms of a RB or subchannel, in subframe K for its next SL radio transmission of data. The selection or reservation of the radio resource(s) is illustrated by a broken arrow. In view of the coordination, the first UE 20 use the same radio resource(s) in subframe K-N to transmit the SCSI-RS, where the number N defines the coordinated time interval in units of subframes. Similarly, the third UE 40 selects or reserves one or more radio resources in subframe K for its next SL radio transmission, which may potentially overlap with the radio resource(s) selected by the first UE 20. For example, the first UE 20 and the third UE 40 could select the radio resource(s) from the same resource pool. Also for the third UE 40, the selection or reservation of the radio resource(s) is illustrated by a broken arrow. In view of the time coordination, also third UE 40 will transmit the SCSI-RS in subframe K-N. Accordingly, both the SCSI-RS transmissions by the first UE 20 and the third UE 40 in subframe N-K as well as the SL radio transmissions of data in subframe N will collide. This in turn has the effect that the conditions for the SCSI-RS transmission are similar as for the SL radio transmissions of data. The SCSI-RS transmitted by the first UE 20 and the SCSI-RS transmitted by the third UE 40 thus enable another UE, e.g., the second UE 30, to precisely estimate both the channel conditions and interference level for the SL radio transmission of data.

In some scenarios, the time interval between the SCSI-RS transmission and the subsequent SL radio transmission could also be configured to correspond to zero subframes, which means that the SCSI-RS and SL radio transmission would be performed in the same subframe. This variant may for example be useful if the SL radio transmissions and the associated SCSI-RS transmissions are performed according to a periodic pattern.

The above-mentioned coordination of the relative timing of SL radio transmissions and SCSI-RS transmissions for multiple UEs can also be combined with the above-mentioned control of the SCSI-RS transmission by the SCSI-RS SA. For example, the processes as explained in connection with FIGS. 3, 4, and 5 could be supplemented by the coordination of the relative timing of SL radio transmissions and associated SCSI-RS transmissions by the UEs 20, 30, 40, e.g., the SL radio transmissions 306, 407 by the UEs 20, 30, and the reference signal transmissions 304, 404, 506 by the UE 20, as well as other SL radio transmissions and reference signal transmissions by the UE 20, 30, or 40 which are not illustrated in FIG. 3, 4, or 5. In this way, any residual hidden node issues can be further reduced, e.g., in scenarios where propagation of the SCSI-RS SA to a hidden node is not successful.

Figure 9:
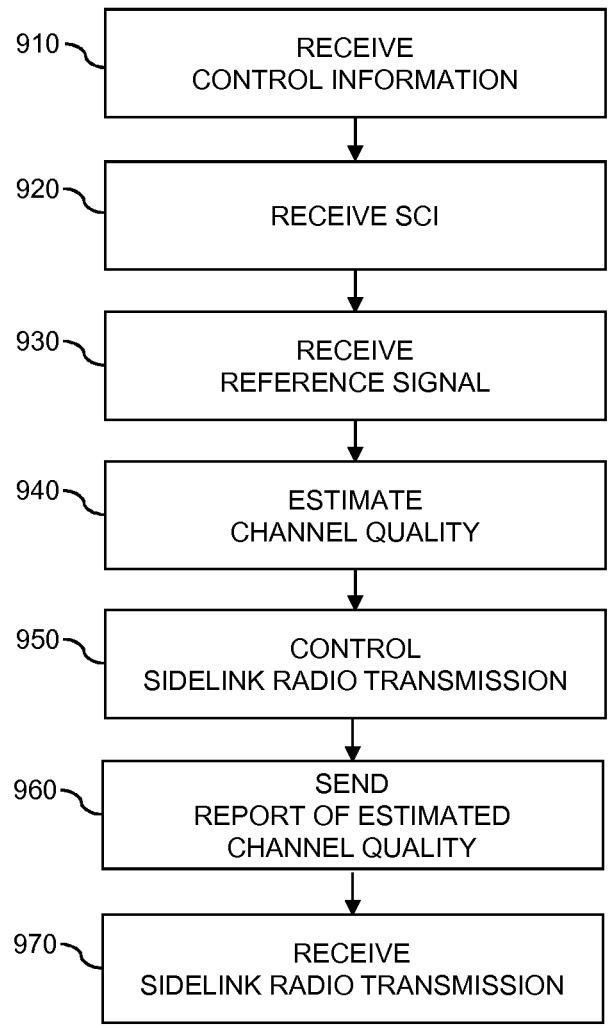
FIG. 9 shows an exemplary flowchart for schematically illustrating a method of involving reception of a SL reference signal according to an embodiment of the invention.

FIG. 9 shows a flowchart for illustrating a method of controlling SL radio transmissions, which may be utilized for implementing the illustrated concepts. The method of FIG. 9 may be used for implementing the illustrated concepts in a radio device which receives a reference signal from a further radio device. For example, the radio device could correspond to the above-mentioned second UE 30, and the further radio device could correspond to the above-mentioned first UE 20.

If a processor-based implementation of the radio device is used, at least some of the steps of the method of FIG. 9 may be performed and/or controlled by one or more processors of the radio device. Such radio device may also include a memory storing program code for implementing at least some of the below described functionalities or steps of the method of FIG. 9.

At step 910, the radio device may receive control information. The control information may have the purpose of configuring at least one radio resource for receiving SCI from the further radio device. The radio device may receive at least a part of the control information from a node of the wireless communication network such as the above-mentioned access node 100, e.g., as explained in connection with the processes of FIG. 6A or 6B. For example, the control information could be received as part of broadcasted system information. Further, the control information could be received in an RRC message. Further, the radio device may receive at least a part of the control information from the further radio device and/or some other radio device, e.g., in a handshake at connection setup or some other occasion as explained in connection with the processes of FIG. 7.

At step 920, the radio device receives SCI from the further radio device. The SCI indicates at least one radio resource for transmission of a reference signal from the further radio device. The reference signal may be used as a basis for controlling an SL radio transmission from the radio device to the further radio device, e.g., like in the processes of FIG. 3, or as a basis for controlling an SL radio transmission from the further radio device to the radio device, e.g., like in the processes of FIG. 4. The SCI may indicate the at least one radio resource in terms of time and/or frequency position, e.g., RB, time slot, subframe, and/or frequency subchannel. For example, the SCI may include an SCSI-RS SA as explained in connection with the processes of FIG. 3, 4, or 5.

The radio device may receive the SCI on at least one radio resource configured based on the control information received at step 910. In addition or as an alternative, the at least one radio resource on which the radio device receives the SCI may be configured based on negotiation with the further radio device, e.g., as explained on connection with the processes of FIG. 7, and/or based on configuration information stored in the radio device, e.g., a standardized configuration, a configuration based on manufacturer settings, and/or a configuration based on operator settings.

In response to receiving the SCI at step 920, the radio device may exclude the at least one radio resource indicated by the SCI from being used for an SL radio transmission by the radio device.

In some scenarios, e.g., as explained in connection with the processes of FIGS. 3 and 4, the radio device may also forward the received SCI to one or more other radio devices. In this case, the radio device may control whether to forward the received SCI to one or more other radio devices depending on at least one of: battery power level of the radio device and availability of radio resources for forwarding of the SCI.

In scenarios where the radio device sends an SL radio transmission to the further radio device, with the SL radio transmission being controlled based on the reference signal transmitted by the further radio device, the radio device may control whether to forward the received SCI to one or more other radio devices depending on at least one of: priority of the SL radio transmission from the radio device, traffic type of the SL radio transmission from the radio device, a latency requirement of the SL radio transmission from the radio device, and a reliability requirement of the SL radio transmission from the radio device.

In scenarios where the radio device receives an SL radio transmission from the further radio device, with the SL radio transmission being controlled based on the reference signal transmitted by the further radio device, the radio device may control whether to forward the received SL control information to one or more other radio devices depending on at least one of: priority of the SL radio transmission from the further radio device, traffic type of the SL radio transmission from the further radio device, a latency requirement of the SL radio transmission from the further radio device, and a reliability requirement of the SL radio transmission from the further radio device.

At step 930, the radio device receives the reference signal on the at least one radio resource indicated by the SCI received at step 920. The reference signal may for example correspond to the above-mentioned SCSI-RS 304 or 404.

At step 940, the radio device estimates quality of a radio channel between the radio device and the further radio device based on the reference signal received at step 930. The quality of the radio channel may for example be estimated in terms of one or more CQIs, a PMI, or one or more channel coefficients.

At step 950, the radio device controls an SL radio transmission from the radio device to the further radio device based on the quality of the radio channel estimate at step 940. The above-mentioned SL radio transmission 306 is an example of such radio transmission controlled by the radio device. This may for example involve selecting an MCS of the SL radio transmission based on the estimated channel quality or adapting transmit power of the SL radio transmission based on the estimated channel quality. If the SL radio transmission is based on beamforming or precoding, the control of the SL radio transmission may also involve selecting a beamforming configuration or precoding configuration based on the estimated channel quality.

At step 960, as an alternative or in addition to step 950, the radio device sends a report of the estimated quality of the radio channel to the further radio device. The report indicates the quality of the radio channel estimated at step 940, e.g., in terms of one or more CQIs, a PMI, or one or more channel coefficients. From the further radio device, the radio device may then receive an SL radio transmission which is controlled based on the quality of the radio channel indicated by the report, as indicated by step 970. For example, an MCS of the SL radio transmission may be selected based on the estimated channel quality or transmit power of the SL radio transmission may be adapted based on the estimated channel quality. If the SL radio transmission is based on beamforming or precoding, a beamforming configuration or precoding configuration may be selected based on the estimated channel quality. The above-mentioned SL radio transmission 407 is an example of such radio transmission received by the radio device.

In some scenarios, the radio device may send SL radio transmissions, such as the above-mentioned SL radio transmission, and reference signals on at least one radio resource which is further being utilized for SL radio transmissions and transmissions of reference signals by at least one other radio device, e.g., by the further radio device and/or one or more other radio devices. The SL radio transmissions may be performed according to a periodic time pattern. For example, these multiple radio devices could select radio resources for the SL radio transmissions from the same resource pool and/or operate on the same carrier frequency. In this case, the radio device may configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device. Accordingly, the relative timing of SL radio transmissions and reference signal transmissions may be coordinated, e.g., as explained in connection with FIG. 8. In some scenarios, the time interval may be configured to be zero in units of time slots or subframes, i.e., the radio devices may be configured to send the reference signal and the SL radio transmission in the same time slot or subframe. The time interval may be configured based on received control information, e.g., the control information received at step 910. In addition or as an alternative, the time interval may be configured based on negotiation with the at least one other radio device, e.g., as explained on connection with the processes of FIG. 7, and/or based on configuration information stored in the radio device, e.g., a standardized configuration, a configuration based on manufacturer settings, and/or a configuration based on operator settings.

Figure 10:
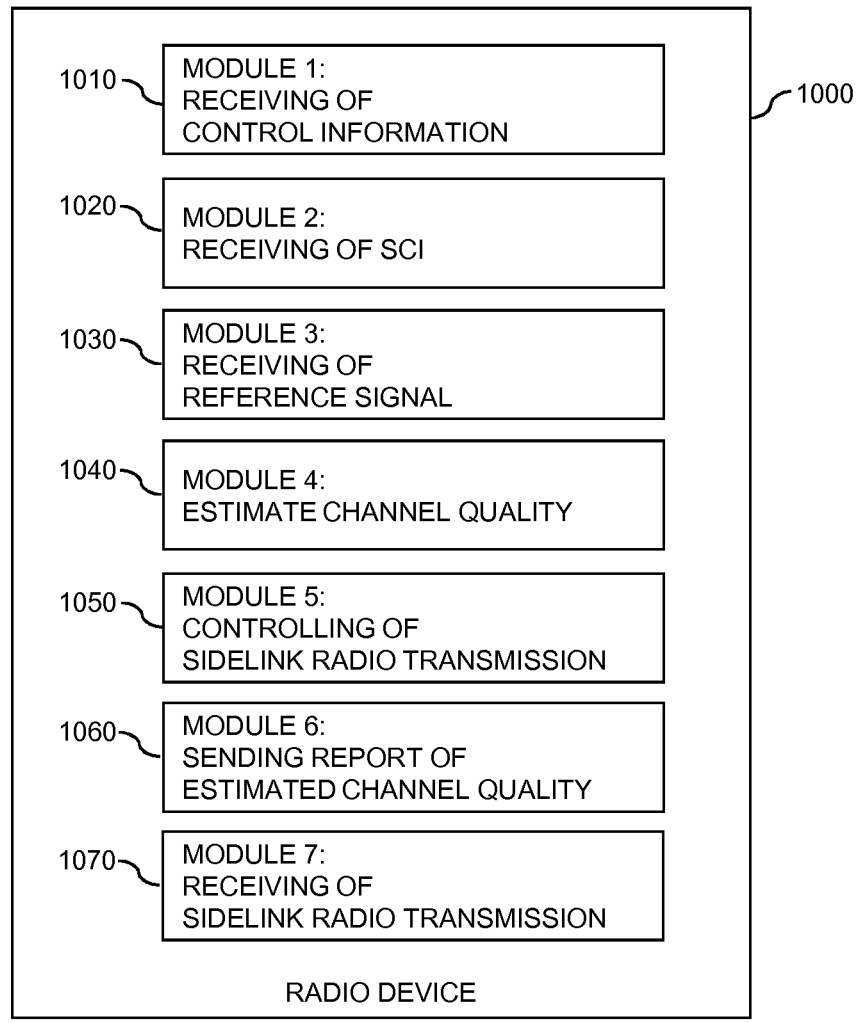
FIG. 10 shows an exemplary block diagram for illustrating functionalities of a radio device implementing functionalities corresponding to the method of FIG. 9.

FIG. 10 shows a block diagram for illustrating functionalities of a radio device 1000 which operates according to the method of FIG. 9. The radio device 1000 may for example correspond to the above-mentioned second UE 30. As illustrated, the radio device 1000 may optionally be provided with a module 1010 configured to receive control information, such as explained in connection with step 910. Further, the radio device 1000 may be provided with a module 1020 configured to receive SCI, such as explained in connection with step 920. Further, the radio device 1000 may be provided with a module 1030 configured to receive a reference signal, such as explained in connection with step 930. Further, the radio device 1000 may be provided with a module 1040 configured to estimate quality of a radio channel, such as explained in connection with step 940. Further, the radio device 1000 may be provided with a module 1050 configured to control an SL radio transmission from the radio device, such as explained in connection with step 950. As an alternative or in addition to the module 1050, the radio device 1000 may be provided with a module 1060 configured to send a report of the estimated quality of the radio channel, such as explained in connection with step 960, and a module 1070 configured to receive an SL radio transmission, such as explained in connection with step 970.

It is noted that the radio device 1000 may include further modules for implementing other functionalities, such as known functionalities of a UE supporting V2X or other types of SL communication. Further, it is noted that the modules of the radio device 1000 do not necessarily represent a hardware structure of the radio device 1000, but may also correspond to functional elements, e.g., implemented by hardware, software, or a combination thereof.

Figure 11:
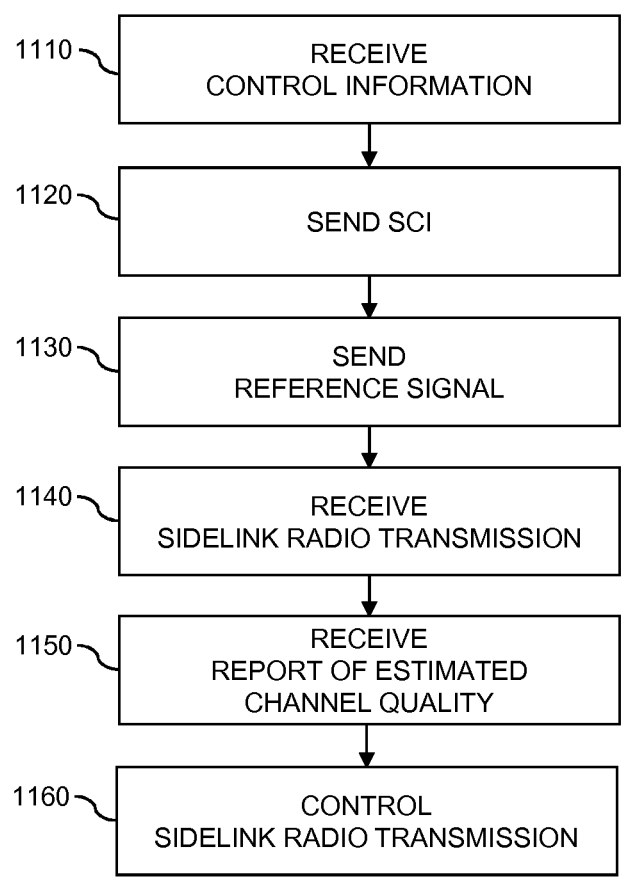
FIG. 11 shows an exemplary flowchart for schematically illustrating a method of involving sending of a SL reference signal according to an embodiment of the invention.

FIG. 11 shows a flowchart for illustrating a further method of controlling SL radio transmissions, which may be utilized for implementing the illustrated concepts. The method of FIG. 11 may be used for implementing the illustrated concepts in a radio device which sends a reference signal to a further radio device. For example, the radio device could correspond to the above-mentioned first UE 20, and the further radio device could correspond to the above-mentioned second UE 30.

If a processor-based implementation of the radio device is used, at least some of the steps of the method of FIG. 11 may be performed and/or controlled by one or more processors of the radio device. Such radio device may also include a memory storing program code for implementing at least some of the below described functionalities or steps of the method of FIG. 11.

At step 1110, the radio device may receive control information. The control information may have the purpose of configuring at least one radio resource for receiving SCI from the further radio device. The radio device may receive at least a part of the control information from a node of the wireless communication network such as the above-mentioned access node 100, e.g., as explained in connection with the processes of FIG. 6A or 6B. For example, the control information could be received as part of broadcasted system information. Further, the control information could be received in an RRC message. Further, the radio device may receive at least a part of the control information from the further radio device and/or some other radio device, e.g., in a handshake at connection setup or some other occasion as explained in connection with the processes of FIG. 7.

At step 1120, the radio device sends SCI to the further radio device. The SCI indicates at least one radio resource for transmission of a reference signal from the radio device. The reference signal may be used as a basis for controlling an SL radio transmission from the radio device to the further radio device, e.g., like in the processes of FIG. 4, or as a basis for controlling an SL radio transmission from the further radio device to the radio device, e.g., like in the processes of FIG. 3. The SCI may indicate the at least one radio resource in terms of time and/or frequency position, e.g., RB, time slot, subframe, and/or frequency subchannel. For example, the SCI may include an SCSI-RS SA as explained in connection with the processes of FIG. 3, 4, or 5.

The radio device may send the SCI on at least one radio resource configured based on the control information received at step 1110. In addition or as an alternative, the at least one radio resource on which the radio device sends the SCI may be configured based on negotiation with the further radio device, e.g., as explained on connection with the processes of FIG. 7, and/or based on configuration information stored in the radio device, e.g., a standardized configuration, a configuration based on manufacturer settings, and/or a configuration based on operator settings.

At step 1130, the radio device sends the reference signal on the at least one radio resource indicated by the SCI transmitted at step 1120. The reference signal may for example correspond to the above-mentioned SCSI-RS 304 or 404. The reference signal enables the further radio device to estimate quality of a radio channel between the radio device and the further radio device.

At step 1140, the radio device receives an SL radio transmission from the further radio device. The SL radio transmission is controlled based on based on the quality of the radio channel estimated from the reference signal transmitted at step 1140. For example, an MCS of the SL radio transmission may be selected based on the estimated channel quality or transmit power of the SL radio transmission may be adapted based on the estimated channel quality. If the SL radio transmission is based on beamforming or precoding, a beamforming configuration or precoding configuration may be selected based on the estimated channel quality. The above-mentioned SL radio transmission 306 is an example of such radio transmission received by the radio device.

At step 1150, the radio device receives a report of the quality of the radio channel as estimated by the further radio device on the basis of the reference signal transmitted at step 1130. The report may indicate in terms of one or more CQIs, a PMI, or one or more channel coefficients.

At step 1160, the radio device controls an SL radio transmission from the radio device to the further radio device based on the quality of the radio channel indicated by the report received at step 1150. This may for example involve selecting an MCS of the SL radio transmission based on the estimated channel quality or adapting transmit power of the SL radio transmission based on the estimated channel quality. If the SL radio transmission is based on beamforming or precoding, the control of the SL radio transmission may also involve selecting a beamforming configuration or precoding configuration based on the estimated channel quality. The above-mentioned SL radio transmission 407 is an example of such radio transmission controlled by the radio device.

It is noted that steps 1150 and 1160 may be performed in addition or as an alternative to step 1140.

In some scenarios, the radio device may send SL radio transmissions, such as the above-mentioned SL radio transmission 407, and reference signals, such as the above-mentioned reference signal 304, 404, or 506, on at least one radio resource which is further being utilized for SL radio transmissions and transmissions of reference signals by at least one other radio device, e.g., by the further radio device and/or one or more other radio devices. The SL radio transmissions may be performed according to a periodic time pattern. For example, these multiple radio devices could select radio resources for the SL radio transmissions from the same resource pool and/or operate on the same carrier frequency. In this case, the radio device may configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device. Accordingly, the relative timing of SL radio transmissions and reference signal transmissions may be coordinated, e.g., as explained in connection with FIG. 8. In some scenarios, the time interval may be configured to be zero in units of time slots or subframes, i.e., the radio devices may be configured to send the reference signal and the SL radio transmission in the same time slot or subframe. The time interval may be configured based on received control information, e.g., the control information received at step 1110. In addition or as an alternative, the time interval may be configured based on negotiation with the at least one other radio device, e.g., as explained on connection with the processes of FIG. 7, and/or based on configuration information stored in the radio device, e.g., a standardized configuration, a configuration based on manufacturer settings, and/or a configuration based on operator settings.

Figure 12:
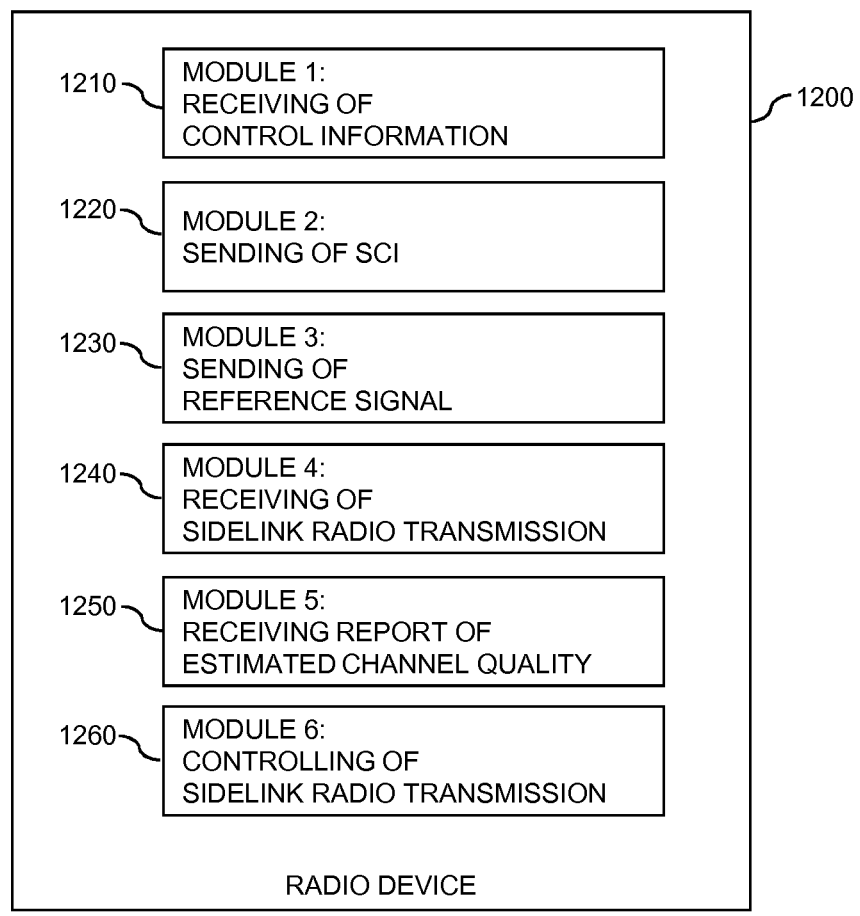
FIG. 12 shows an exemplary block diagram for illustrating functionalities of a radio device implementing functionalities corresponding to the method of FIG. 11.

FIG. 12 shows a block diagram for illustrating functionalities of a radio device 1200 which operates according to the method of FIG. 11. The radio device 1200 may for example correspond to the above-mentioned second UE 20. As illustrated, the radio device 1200 may optionally be provided with a module 1210 configured to receive control information, such as explained in connection with step 1110. Further, the radio device 1200 may be provided with a module 1220 configured to send SCI, such as explained in connection with step 1120. Further, the radio device 1200 may be provided with a module 1130 configured to send a reference signal, such as explained in connection with step 1130. Further, the radio device 1200 may be provided with a module 1240 configured to receive an SL radio transmission, such as explained in connection with step 1140. Further, the radio device 1200 may be provided with a module 1250 configured to receive a report of estimated quality of a radio channel, such as explained in connection with step 1150. Further, the radio device 1200 may be provided with a module 1260 configured to control an SL radio transmission from the radio device, such as explained in connection with step 1160. Here, it is noted that the modules 1250 and 1260 may be provided in addition or as an alternative to the module 1240.

It is noted that the radio device 1200 may further modules for implementing other functionalities, such as known functionalities of a UE supporting V2X or other types of SL communication. Further, it is noted that the modules of the radio device 1200 do not necessarily represent a hardware structure of the radio device 1200, but may also correspond to functional elements, e.g., implemented by hardware, software, or a combination thereof.

Figure 13:
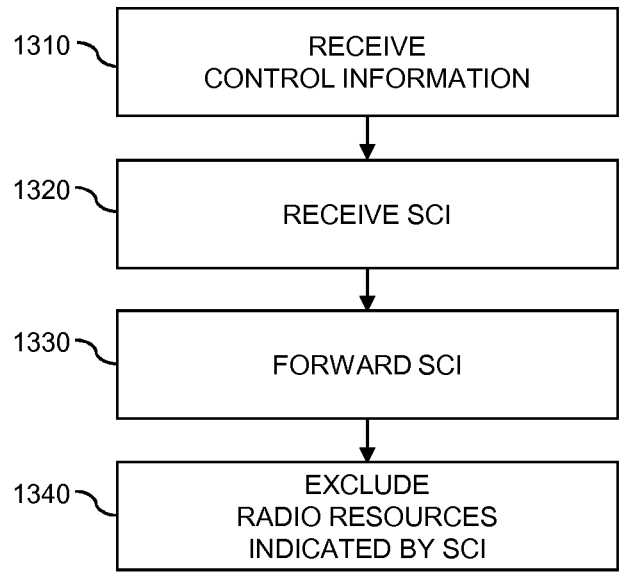
FIG. 13 shows an exemplary flowchart for schematically illustrating a method of involving forwarding SL control information controlling transmission of a SL reference signal according to an embodiment of the invention.

FIG. 13 shows a flowchart for illustrating a further method of controlling SL radio transmissions, which may be utilized for implementing the illustrated concepts. The method of FIG. 13 may be used for implementing the illustrated concepts in a radio device which receives SCI associated with a reference signal from a further radio device and forwards the SCI to one or more other radio devices. For example, the radio device could correspond to the above-mentioned second UE 30, and the further radio device could correspond to the above-mentioned first UE 20. The one or more other radio devices could for example include the above-mentioned third UE 40.

If a processor-based implementation of the radio device is used, at least some of the steps of the method of FIG. 13 may be performed and/or controlled by one or more processors of the radio device. Such radio device may also include a memory storing program code for implementing at least some of the below described functionalities or steps of the method of FIG. 13.

At step 1310, the radio device may receive control information. The control information may have the purpose of configuring at least one radio resource for receiving SCI from the further radio device. The radio device may receive at least a part of the control information from a node of the wireless communication network such as the above-mentioned access node 100, e.g., as explained in connection with the processes of FIG. 6A or 6B. The radio device may receive the control information in a broadcast message which is also receivable by the at least one other radio device. For example, the control information could be received as part of broadcasted system information. Further, the control information could be received in an RRC message. Further, the radio device may receive at least a part of the control information from the further radio device and/or some other radio device, e.g., in a handshake at connection setup or some other occasion as explained in connection with the processes of FIG. 7.

At step 1320, the radio device receives SCI from the further radio device. The SCI indicates at least one radio resource for transmission of a reference signal from the further radio device. The reference signal may be used as a basis for controlling an SL radio transmission from the radio device to the further radio device, e.g., like in the processes of FIG. 3, or as a basis for controlling an SL radio transmission from the further radio device to the radio device, e.g., like in the processes of FIG. 4. The SCI may indicate the at least one radio resource in terms of time and/or frequency position, e.g., RB, time slot, subframe, and/or frequency subchannel. For example, the SCI may include an SCSI-RS SA as explained in connection with the processes of FIG. 3, 4, or 5.

The radio device may receive the SCI on at least one radio resource configured based on the control information received at step 1310. In addition or as an alternative, the at least one radio resource on which the radio device receives the SCI may be configured based on negotiation with the further radio device, e.g., as explained on connection with the processes of FIG. 7, and/or based on configuration information stored in the radio device, e.g., a standardized configuration, a configuration based on manufacturer settings, and/or a configuration based on operator settings.

At step 1330, the radio device forwards the received SCI to one or more other radio devices. Here, the radio device may control whether to forward the received SCI to one or more other radio devices depending on at least one of: battery power level of the radio device and availability of radio resources for forwarding of the SCI.

If the radio device itself intends to send an SL radio transmission, e.g., to the further radio device, the radio device may also control whether to forward the received SCI to one or more other radio devices depending on at least one of: priority of the SL radio transmission of the SL radio transmission from the radio device, traffic type of the SL radio transmission from the radio device, a latency requirement of the SL radio transmission from the radio device, and a reliability requirement of the SL radio transmission from the radio device.

If the radio device expects to receive an SL radio transmission from the further radio device, the radio device may control whether to forward the received SL control information to one or more other radio devices depending on at least one of: priority of the SL radio transmission from the further radio device, traffic type of the SL radio transmission from the further radio device, a latency requirement of the SL radio transmission from the further radio device, and a reliability requirement of the SL radio transmission from the further radio device.

At step 1340, in response to receiving the SCI at step 1320, the radio device may exclude the at least one radio resource indicated by the SCI from being used for an SL radio transmission by the radio device, e.g., as explained in connection with the processes of FIGS. 3 and 4.

In some scenarios, the radio device may send SL radio transmissions, such as the above-mentioned SL radio transmission 306, and reference signals on at least one radio resource which is further being utilized for SL radio transmissions and transmissions of reference signals by at least one other radio device, e.g., by the further radio device and/or one or more other radio devices. The SL radio transmissions may be performed according to a periodic time pattern. For example, these multiple radio devices could select radio resources for the SL radio transmissions from the same resource pool and/or operate on the same carrier frequency. In this case, the radio device may configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device. Accordingly, the relative timing of SL radio transmissions and reference signal transmissions may be coordinated, e.g., as explained in connection with FIG. 8. In some scenarios, the time interval may be configured to be zero in units of time slots or subframes, i.e., the radio devices may be configured to send the reference signal and the SL radio transmission in the same time slot or subframe. The time interval may be configured based on received control information, e.g., the control information received at step 1310. In addition or as an alternative, the time interval may be configured based on negotiation with the at least one other radio device, e.g., as explained in connection with the processes of FIG. 7, and/or based on configuration information stored in the radio device, e.g., a standardized configuration, a configuration based on manufacturer settings, and/or a configuration based on operator settings.

Figure 14:
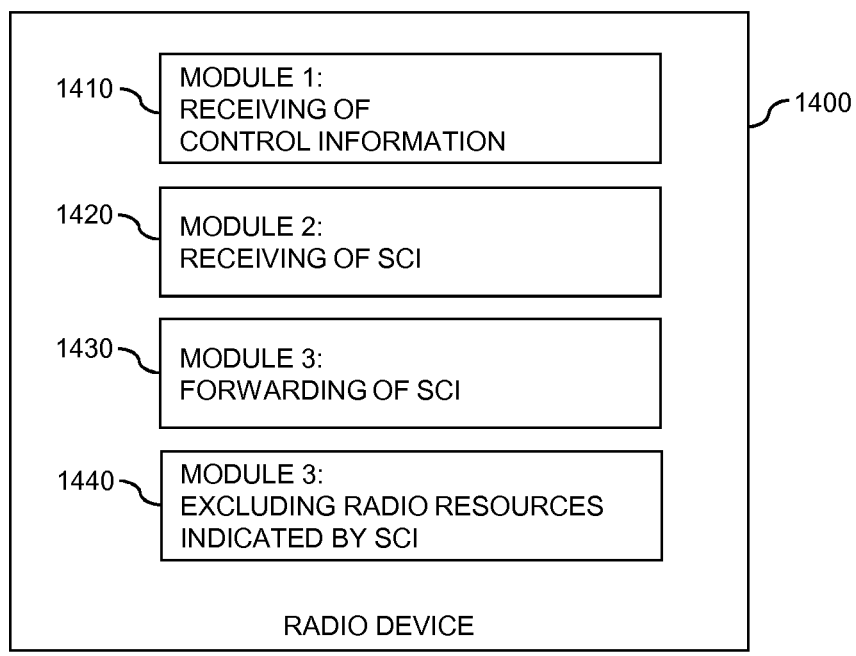
FIG. 14 shows an exemplary block diagram for illustrating functionalities of a radio device implementing functionalities corresponding to the method of FIG. 13.

FIG. 14 shows a block diagram for illustrating functionalities of a radio device 1400 which operates according to the method of FIG. 13. The radio device 1400 may for example correspond to the above-mentioned second UE 30. As illustrated, the radio device 1400 may optionally be provided with a module 1410 configured to receive control information, such as explained in connection with step 1310. Further, the radio device 1400 may be provided with a module 1420 configured to receive SCI, such as explained in connection with step 1320. Further, the radio device 1400 may be provided with a module 1430 configured to forward the received SCI, such as explained in connection with step 1330. Further, the radio device 1400 may optionally be provided with a module 1440 configured to exclude radio resources from being used for an SL radio transmission by the radio device, such as explained in connection with step 1340.

It is noted that the radio device 1400 may include further modules for implementing other functionalities, such as known functionalities of a UE supporting V2X or other types of SL communication. Further, it is noted that the modules of the radio device 1400 do not necessarily represent a hardware structure of the radio device 1400, but may also correspond to functional elements, e.g., implemented by hardware, software, or a combination thereof.

Figure 15:
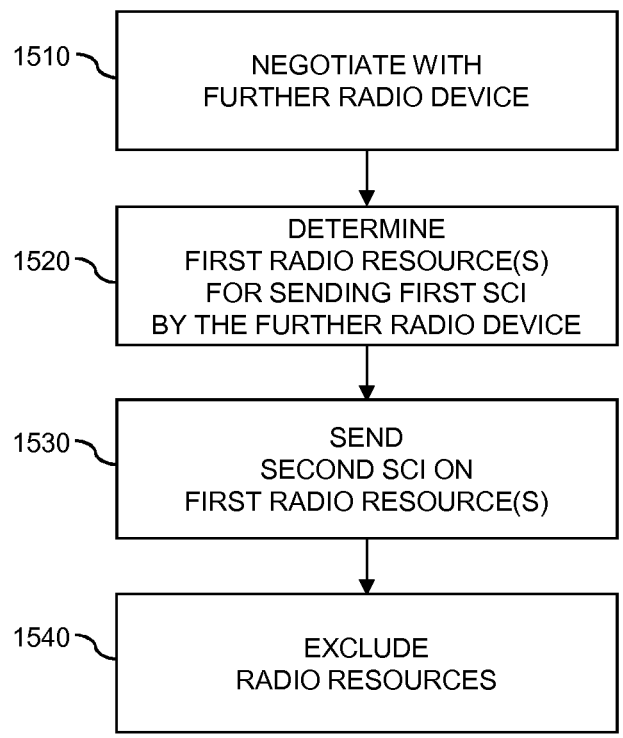
FIG. 15 shows an exemplary flowchart for schematically illustrating a method of involving coordinated transmission of SL control information controlling transmission of a SL reference signal according to an embodiment of the invention.

FIG. 15 shows a flowchart for illustrating a further method of controlling SL radio transmissions, which may be utilized for implementing the illustrated concepts. The method of FIG. 15 may be used for implementing the illustrated concepts in a radio device which participates in coordinated propagation of SCI associated with a reference signal from a further radio device. For example, the radio device could correspond to the above-mentioned second UE 30 in the processes of FIG. 5, and the further radio device could correspond to the above-mentioned first UE 20 in the processes of FIG. 5. The SCI may be propagated to one or more other radio devices, which could for example include the above-mentioned third UE 40 in the processes of FIG. 5.

If a processor-based implementation of the radio device is used, at least some of the steps of the method of FIG. 15 may be performed and/or controlled by one or more processors of the radio device. Such radio device may also include a memory storing program code for implementing at least some of the below described functionalities or steps of the method of FIG. 15.

At step 1510, the radio devices negotiates with the further radio device. This may for example involve bidirectional exchange of control information, e.g., as part of a handshake at connection setup as explained in connection with the processes of FIG. 5. However, in some cases the negotiation could also be based on unidirectional transfer of control information from the radio device to the further radio device or from the further radio device to the radio device. Further, the negotiation could also be supplemented by control information received from other sources, e.g., from a node of the wireless communication network, such as the above-mentioned access node 100.

At step 1520, the radio device determines at least one first radio resource for sending first SCI by the further radio device. This is accomplished based on the negotiation at step

1510. The sidelink control information indicates at least one second radio resource for transmission of a reference signal from the further radio device. The reference signal may be used as a basis for controlling an SL radio transmission from the radio device to the further radio device, e.g., like in the processes of FIG. 3, or as a basis for controlling an SL radio transmission from the further radio device to the radio device, e.g., like in the processes of FIG. 4. The first SCI may indicate the at least one radio resource in terms of time and/or frequency position, e.g., RB, time slot, subframe, and/or frequency subchannel. For example, the first SCI may include an SCSI-RS SA as explained in connection with the processes of FIG. 3, 4, or 5.

At step 1530, the radio device sends second SCI on the first radio resource determined at step 1520 to one or more other radio devices, e.g., to the above-mentioned third UE 40. The second SCI indicates the at least one second radio resource for transmission of the reference signal by the further radio device. For example, the second SCI may include the same SCSI-RS SA as the first SCI. If the first SCI includes additional information to the SCSI-RS SA, the second SCI may also include at least a part of this information. In some scenarios, the second SCI may also differ from the first SCI. For example, the second SCI could include one or more additional SCSI-RS SAs, e.g., from the radio device itself or from one or more other radio devices, which are propagated in a similar manner as the SCSI-RS SA from the further radio device. Accordingly the second SCI may be identical to the first SCI or differ partially from the first SCI, e.g., by also indicating at least one third radio resource for transmission of a further reference signal from the radio device.

The radio device may send the second SCI on the same radio resources as used by the further radio device for sending the first SCI, i.e., in the same time slot or subframe and on the same frequency resources.

The radio device may control whether to send the second SCI depending on at least one of: battery power level of the radio device and availability of radio resources for forwarding of the SCI.

If the radio device itself intends to send an SL radio transmission, e.g., to the further radio device, the radio device may also control whether to send the second SCI to one or more other radio devices depending on at least one of: priority of the SL radio transmission from the radio device, traffic type of the SL radio transmission from the radio device, a latency requirement of the SL radio transmission from the radio device, and a reliability requirement of the SL radio transmission from the radio device.

If the radio device expects to receive an SL radio transmission from the further radio device, the radio device may control whether to send the second SL control information to one or more other radio devices depending on at least one of: priority of the SL radio transmission from the further radio device, traffic type of the SL radio transmission from the further radio device, a latency requirement of the SL radio transmission from the further radio device, and a reliability requirement of the SL radio transmission from the further radio device.

At step 1540, the radio device may exclude the at least one radio resource determined at step 1520 from being used for an SL radio transmission by the radio device, e.g., as explained in connection with the processes of FIG. 5.

In some scenarios, the radio device may send SL radio transmissions, such as the above-mentioned SL radio transmission 306, and reference signals on at least one radio resource which is further being utilized for SL radio transmissions and transmissions of reference signals by at least one other radio device, e.g., by the further radio device and/or one or more other radio devices. The SL radio transmissions may be performed according to a periodic time pattern. For example, these multiple radio devices could select radio resources for the SL radio transmissions from the same resource pool and/or operate on the same carrier frequency. In this case, the radio device may configure a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device. Accordingly, the relative timing of SL radio transmissions and reference signal transmissions may be coordinated, e.g., as explained in connection with FIG. 8. In some scenarios, the time interval may be configured to be zero in units of time slots or subframes, i.e., the radio devices may be configured to send the reference signal and the SL radio transmission in the same time slot or subframe. The time interval may be configured based on received control information, e.g., the control information received negotiated at step 910 and/or received from a node of the wireless communication network, e.g., as part of broadcasted system information. In addition or as an alternative, the time interval may be configured based on negotiation with the at least one other radio device, e.g., as explained on connection with the processes of FIG. 7, and/or based on configuration information stored in the radio device, e.g., a standardized configuration, a configuration based on manufacturer settings, and/or a configuration based on operator settings.

Figure 16:
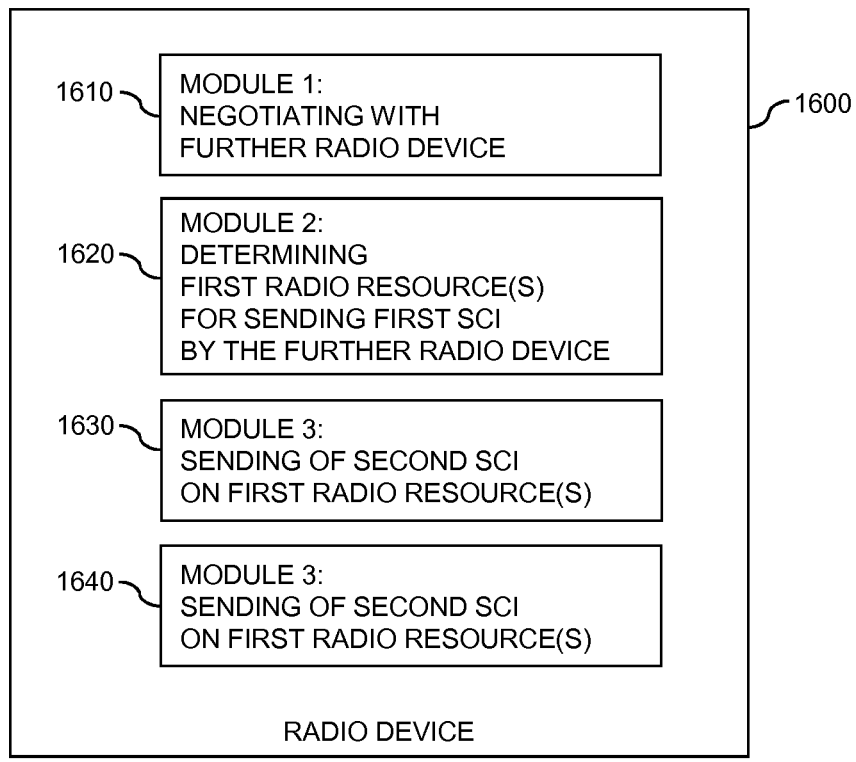
FIG. 16 shows an exemplary block diagram for illustrating functionalities of a radio device implementing functionalities corresponding to the method of FIG. 15.

FIG. 16 shows a block diagram for illustrating functionalities of a radio device 1600 which operates according to the method of FIG. 15. The radio device 1600 may for example correspond to the above-mentioned second UE 30. As illustrated, the radio device 1600 may be provided with a module 1610 configured to negotiate with a further radio device, such as explained in connection with step 1510. Further, the radio device 1600 may be provided with a module 1620 configured to determine at least one first radio resource for sending of first SCI by the further radio receive, such as explained in connection with step 1520. Further, the radio device 1600 may be provided with a module 1630 configured to send second SCI, such as explained in connection with step 1530. Further, the radio device 1600 may optionally be provided with a module 1640 configured to exclude radio resources from being used for an SL radio transmission by the radio device, such as explained in connection with step 1540.

It is noted that the radio device 1600 may include further modules for implementing other functionalities, such as known functionalities of a UE supporting V2X or other types of SL communication. Further, it is noted that the modules of the radio device 1600 do not necessarily represent a hardware structure of the radio device 1600, but may also correspond to functional elements, e.g., implemented by hardware, software, or a combination thereof.

Figure 17:
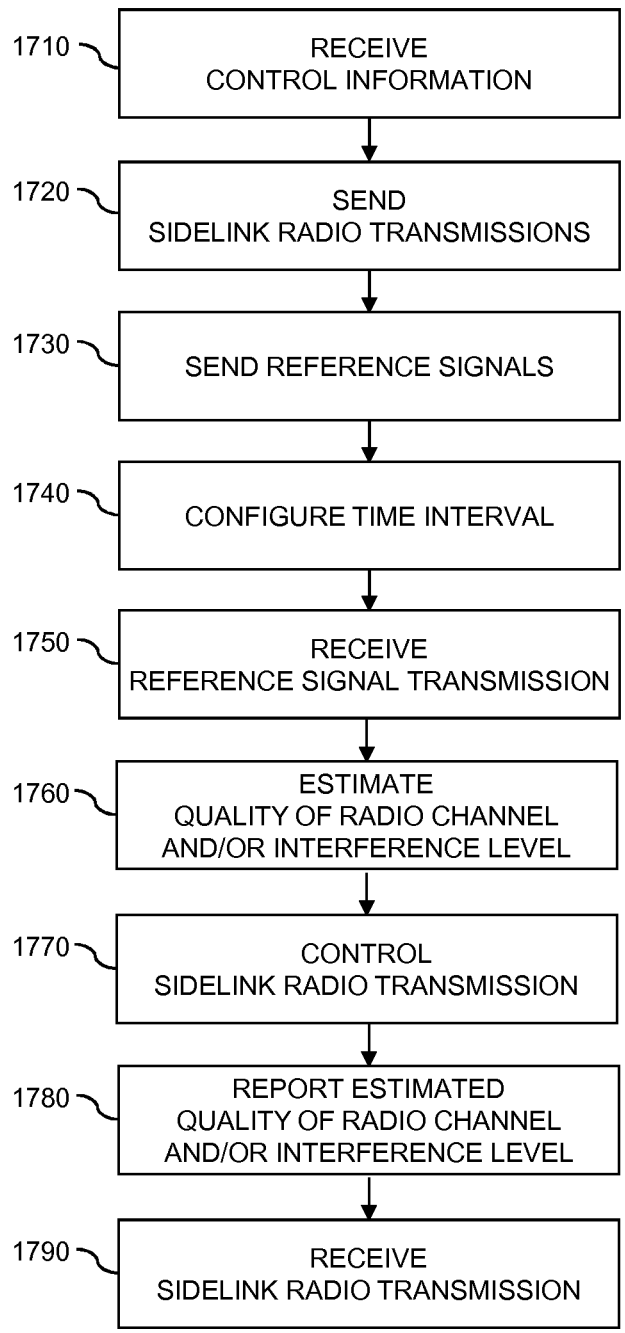
FIG. 17 shows an exemplary flowchart for schematically illustrating a method of involving time-coordination of transmissions of SL reference signals and SL radio transmissions according to an embodiment of the invention.

FIG. 17 shows a flowchart for illustrating a method of controlling SL radio transmissions, which may be utilized for implementing the illustrated concepts. The method of FIG. 17 may be used for implementing the illustrated concepts in a radio device which sends a reference signals and SL radio transmissions on at least one radio resource also being used by one or more other radio devices for sending reference signals and SL radio transmissions. For example, the radio device could correspond to the above-mentioned UEs 20, 30, 40.

If a processor-based implementation of the radio device is used, at least some of the steps of the method of FIG. 17 may be performed and/or controlled by one or more processors of the radio device. Such radio device may also include a memory storing program code for implementing at least some of the below described functionalities or steps of the method of FIG. 17.

At step 1710, the radio device may receive control information. The control information may have the purpose of configuring a relative timing of SL radio transmissions and transmissions of the reference signals by the radio device. Further, the control information may have the purpose of configuring at least one radio resource for transmission of SCI. The radio device may receive at least a part of the control information from a node of the wireless communication network such as the above-mentioned access node 100, e.g., as explained in connection with the processes of FIG. 6A or 6B. The radio device may receive the control information in a broadcast message which is also receivable by the at least one other radio device. For example, the control information could be received as part of broadcasted system information. Further, the radio device may receive at least a part of the control information from the further radio device and/or some other radio device, e.g., in a handshake at connection setup or some other occasion as explained in connection with the processes of FIG. 7.

At step 1720, the radio device sends SL radio transmissions on at least one radio resource which is further being utilized for SL radio transmissions and transmissions of reference signals by at least one other radio device. For example, the SL radio transmissions by the radio device and the SL radio transmissions and transmissions of reference signals by the other radio device(s) may be performed on radio resources selected from the same resource pool or on the same carrier. In some scenarios, the SL radio transmissions may be sent according to a periodic time pattern.

At step 1730, the radio device sends reference signals on the at least one radio resource. The reference signal transmissions may be used for controlling the SL radio transmissions, e.g., by enabling estimating of radio channel quality and/or interference level.

At step 1740, the radio device configures a time interval between an instance of transmission of the reference signals by the radio device and a subsequent instance of transmission of the SL radio transmissions by the radio device to be the same as a time interval between an instance of transmission of the reference signals by the at least one other radio device and a subsequent instance of transmission of the SL radio transmissions by the at least one other radio device. Accordingly, the relative timing of SL radio transmissions and reference signal transmissions may be coordinated, e.g., as explained in connection with FIG. 8. In some scenarios, the time interval may be configured to be zero in units of time slots or subframes, i.e., the radio devices may be configured to send the reference signal and the SL radio transmission in the same time slot or subframe. The time interval may be configured based on received control information, e.g., the control information received at step 1710. In addition or as an alternative, the time interval may be configured based on negotiation with the at least one other radio device, e.g., as explained on connection with the processes of FIG. 7, and/or based on configuration information stored in the radio device, e.g., a standardized configuration, a configuration based on manufacturer settings, and/or a configuration based on operator settings.

At step 1750, the radio device may receive at least one of the reference signal transmissions by the at least one other radio device. The reference signal transmission may for example correspond to a transmission of the above-mentioned SCSI-RS.

At step 1760, the radio device may estimate quality of a radio channel between the radio device and the at least one other radio device and/or an interference level on the radio channel between the radio device and the at least one other radio device. This may be accomplished based on the at least one reference signal received at step 1750.

At step 1770, the radio device may control at least one of the SL radio transmissions by the radio device based on the quality of the radio channel and/or interference level estimated at step 1760. The quality of the radio channel may for example be estimated in terms of one or more CQIs, a PMI, or one or more channel coefficients. The interference level may for example be estimated in terms of an SINR (signal to interference plus noise ratio).

At step 1780, the radio device may report the quality of the radio channel and/or interference level to the at least one other radio device. The quality of the radio channel may for example be reported in terms of one or more CQIs, a PMI, or one or more channel coefficients. The interference level may for example be reported in terms of an SINR.

At step 1790, the radio device may receive at least one SL radio transmission from the at least one other radio device. The received SL radio transmission may be controlled based on the radio channel and/or interference level reported at step 1780.

Figure 18:
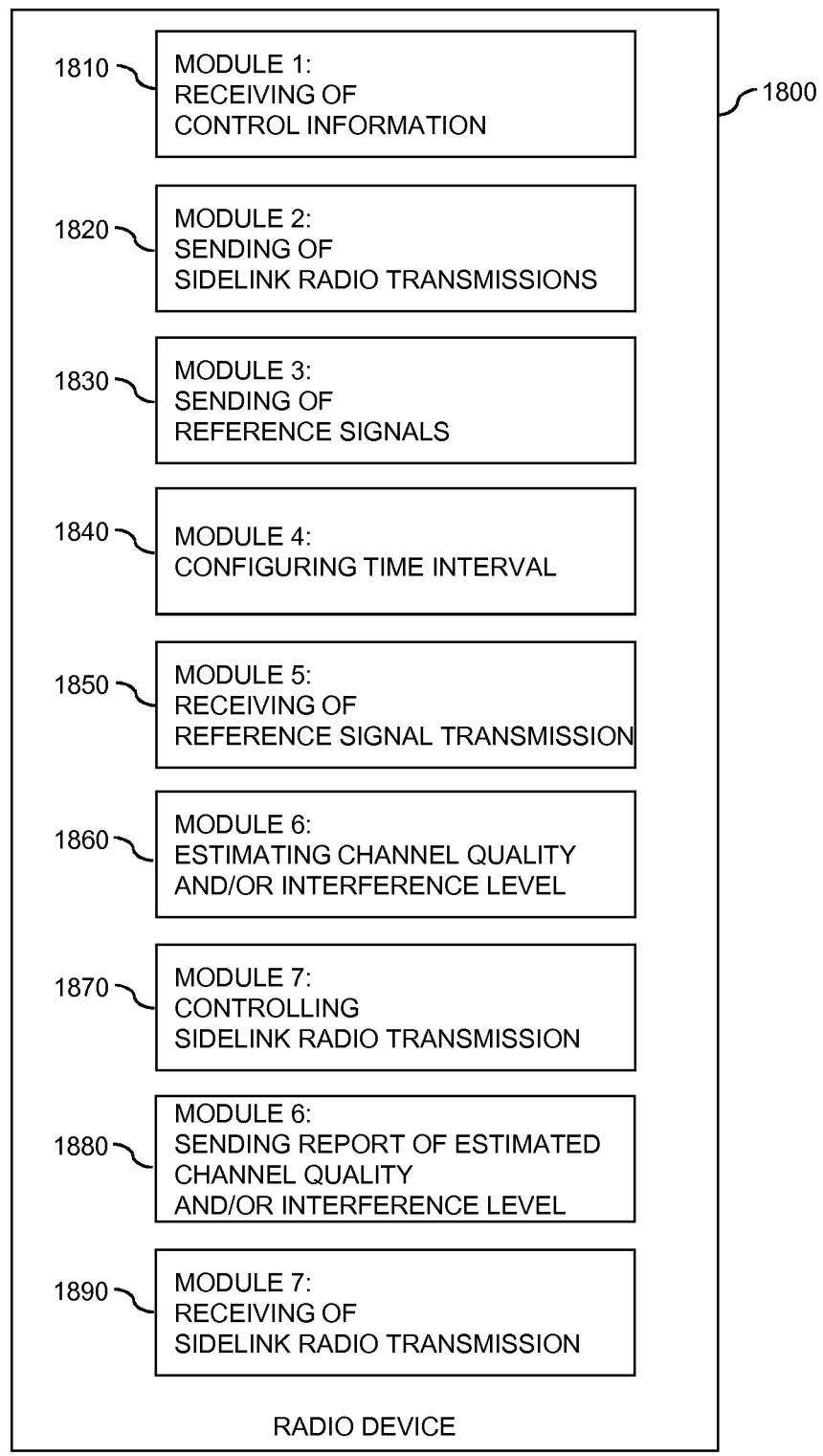
FIG. 18 shows an exemplary block diagram for illustrating functionalities of a radio device implementing functionalities corresponding to the method of FIG. 17.

FIG. 18 shows a block diagram for illustrating functionalities of a radio device 1800 which operates according to the method of FIG. 17. The radio device 1800 may for example correspond to one of the above-mentioned UEs 20, 30, 40. As illustrated, the radio device 1800 may optionally be provided with a module 1810 configured to receive control information, such as explained in connection with step 1710. Further, the radio device 1800 may be provided with a module 1820 configured to send SL radio transmissions, such as explained in connection with step 1720. Further, the radio device 1800 may be provided with a module 1830 configured to send reference signals, such as explained in connection with step 1730. Further, the radio device 1800 may be provided with a module 1840 configured to configure a time interval between an instance of transmission of the SL radio transmissions and an instance of transmission of the reference signals, such as explained in connection with step 1740. Further, the radio device 1800 may optionally be provided with a module 1850 configured to receive a reference signal transmission, such as explained in connection with step 1750. Further, the radio device 1800 may optionally be provided with a module 1860 configured to estimate quality of a radio channel or an interference level, such as explained in connection with step 1760. Further, the radio device 1800 may optionally be provided with a module 1870 configured to control an SL radio transmission from the radio device based on the estimated quality of the radio channel and/or interference level, such as explained in connection with step 1770. Further, the radio device 1800 may optionally be provided with a module 1880 configured to report the estimated quality of the radio channel and/or interference level, such as explained in connection with step 1780. Further, the radio device 1800 may optionally be provided with a module 1890 configured to receive an SL radio transmission, such as explained in connection with step 1790.

It is noted that the radio device 1800 may include further modules for implementing other functionalities, such as known functionalities of a UE supporting V2X or other types of SL communication. Further, it is noted that the modules of the radio device 1800 do not necessarily represent a hardware structure of the radio device 1800, but may also correspond to functional elements, e.g., implemented by hardware, software, or a combination thereof.

Figure 19:
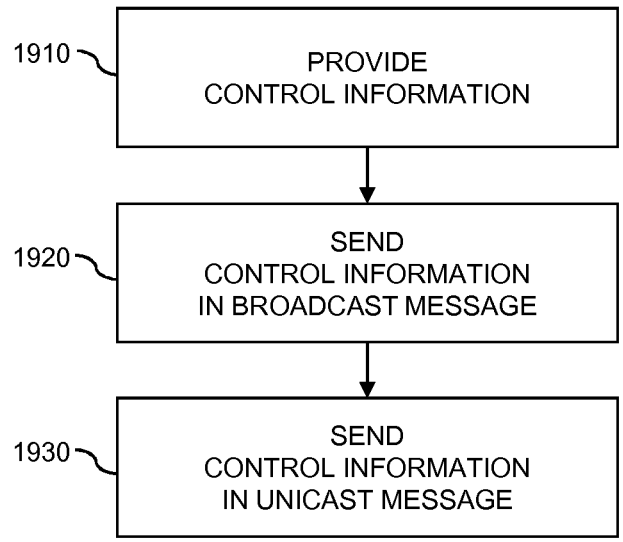
FIG. 19 shows an exemplary flowchart for schematically illustrating a method implemented by a network node to achieve time-coordination of transmissions of a SL reference signals and SL radio transmissions according to an embodiment of the invention.

FIG. 19 shows a flowchart for illustrating a method of controlling SL radio transmissions, which may be utilized for implementing the illustrated concepts. The method of FIG. 19 may be used for implementing the illustrated concepts in a network node which coordinates sending of reference signals and SL radio transmissions by multiple radio device, such as the above-mentioned access node 100.

If a processor-based implementation of the network node is used, at least some of the steps of the method of FIG. 19 may be performed and/or controlled by one or more processors of the network node. Such network node may also include a memory storing program code for implementing at least some of the below described functionalities or steps of the method of FIG. 19.

At step 1910, the network node provides control information to multiple radio devices commonly utilizing at least one radio resource for SL radio transmissions and transmissions of reference signals. For example, the SL radio transmissions by the multiple radio devices may be performed on radio resources selected from the same resource pool or on the same carrier. In some scenarios, at least one of the multiple radio devices may perform the SL radio transmissions may be sent according to a periodic time pattern.

The control information has the purpose of configuring a relative timing of the SL radio transmissions and the transmissions of the reference signals by the multiple radio devices. Specifically, the control information configures a time interval between an instance of transmission of the reference signals and a subsequent instance of transmission of the sidelink radio transmissions to be the same for each of the multiple radio devices. In some scenarios, the time interval may be configured to be zero in units of time slots or subframes, i.e., the radio devices may be configured to send the reference signal and the SL radio transmission in the same time slot or subframe.

The reference signal transmissions may be used for controlling the SL radio transmissions, e.g., by enabling estimating of radio channel quality and/or interference level.

Further, the control information may have the purpose of configuring at least one radio resource for transmission of SCI. The radio device may receive at least a part of the control information from a node of the wireless communication network such as the above-mentioned access node 100, e.g., as explained in connection with the processes of FIG. 6A or 6B.

The node may send at least a part of the control information in a broadcast message which is receivable by the multiple radio devices, as indicated by step 1920.

Alternatively or in addition, the node may send at least a part of the control information in a unicast message which is addressed to one of the multiple radio devices, as indicated by step 1930.

Figure 20:
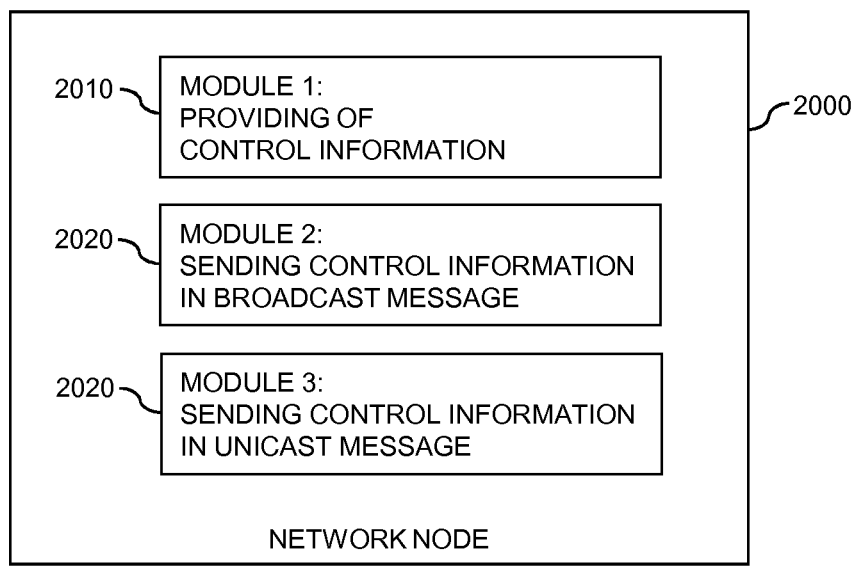
FIG. 20 shows an exemplary block diagram for illustrating functionalities of a network node implementing functionalities corresponding to the method of FIG. 19.

FIG. 20 shows a block diagram for illustrating functionalities of a network node 2000 which operates according to the method of FIG. 19. The network node 2000 may for example correspond to the above-mentioned access node 100. As illustrated, the network node 2000 may be provided with a module 2010 configured to provide control information, such as explained in connection with step 2010. Further, the network node 2000 may optionally be provided with a module 2020 configured to send at least a part of the control information in a broadcast message, such as explained in connection with step 1920. Further, the network node 2000 may optionally be provided with a module 2030 configured to send at least a part of the control information in a unicast message, such as explained in connection with step 1930.

It is noted that the network node 2000 may include further modules for implementing other functionalities, such as known functionalities of an access node for a wireless communication network supporting V2X or other types of SL communication. Further, it is noted that the modules of the network node 2000 do not necessarily represent a hardware structure of the network node 2000, but may also correspond to functional elements, e.g., implemented by hardware, software, or a combination thereof.

It is noted that the functionalities as explained in connection with FIGS. 9 to 20 could be combined in various ways. For example, the same radio device could implement all the functionalities as explained in connection with FIGS. 9 to 18. Further, a radio device implementing functionalities related to sending of a reference signal as explained in connection with FIGS. 9 and 10 could be combined in a system with a radio device implementing functionalities related to using the received reference signal for channel estimation as explained in connection with FIGS. 11 and 12, and/or with a radio device implementing functionalities related to forwarding of the received SCI controlling the reference signal transmission as explained in connection with FIGS. 13 and 14, and/or with a radio device implementing functionalities related to coordinated propagation of the SCI controlling the reference signal transmission as explained in connection with FIGS. 15 and 16. Further, a system could combine multiple radio devices each implementing time coordination functionalities as explained in connection with FIGS. 17 and 18, optionally together with a network node providing control information as explained in connection with FIGS. 19 and 20.

Figure 21:
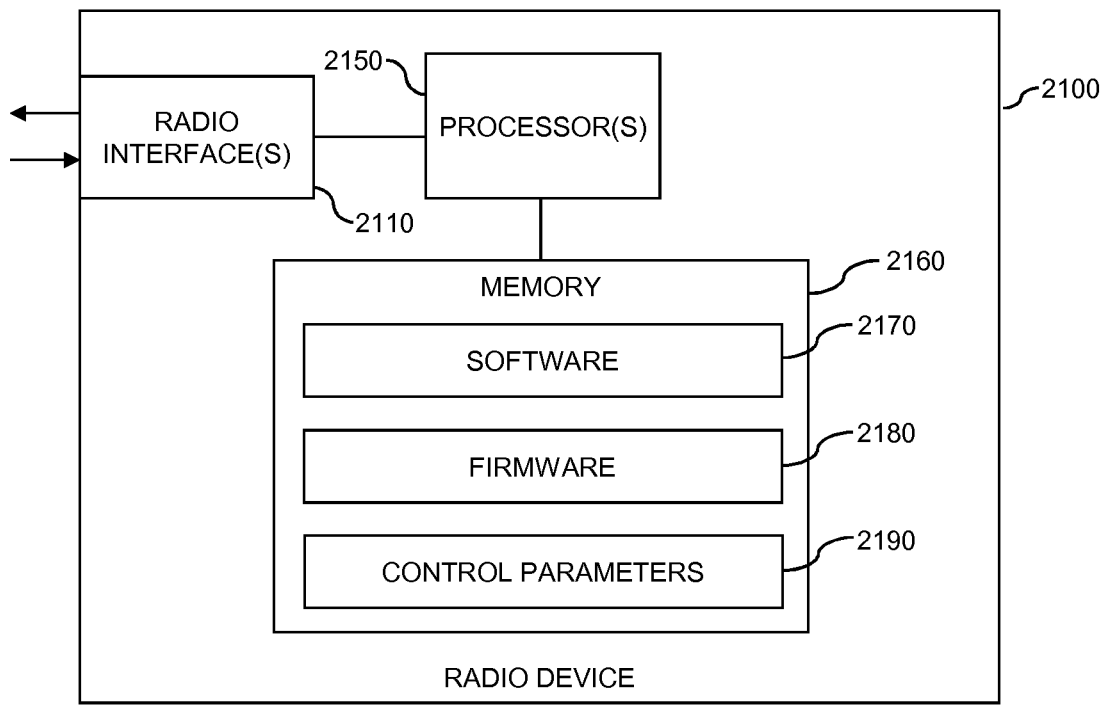
FIG. 21 schematically illustrates structures of a radio device according to an embodiment of the invention.

FIG. 21 illustrates a processor-based implementation of a radio device 2100 which may be used for implementing the above described concepts. For example, the structures as illustrated in FIG. 21 may be used for implementing the concepts in the above-mentioned first UE 20 or second UE 30.

As illustrated, the radio device 2100 includes one or more radio interfaces 2110. The radio interface(s) 2110 may for example support a wireless access technology supporting SL radio transmissions, such as for example the LTE radio technology or NR radio technology. Furthermore, the radio interface(s) 2110 may support DL radio transmissions and UL radio transmissions with a wireless communication network.

Further, the radio device 2100 may include one or more processors 2150 coupled to the radio interface(s) 2110 and a memory 2160 coupled to the processor(s) 2150. By way of example, the radio interface(s) 2110, the processor(s) 2150, and the memory 2160 could be coupled by one or more internal bus systems of the radio device 2100. The memory 2160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 2160 may include software 2170, firmware 2180, and/or control parameters 2190. The memory 2160 may include suitably configured program code to be executed by the processor(s) 2150 so as to implement the above-described functionalities of a radio device, such as explained in connection with FIGS. 9 to 18.

It is to be understood that the structures as illustrated in FIG. 21 are merely schematic and that the radio device 2100 may actually include further components which, for the sake of clarity, have not been illustrated, e.g., further interfaces or processors. Also, it is to be understood that the memory 2160 may include further program code for implementing known functionalities of a UE supporting SL radio transmissions, e.g., for implementing V2X communication. According to some embodiments, also a computer program may be provided for implementing functionalities of the radio device 2100, e.g., in the form of a physical medium storing the program code and/or other data to be stored in the memory 2160 or by making the program code available for download or by streaming.

Figure 22:
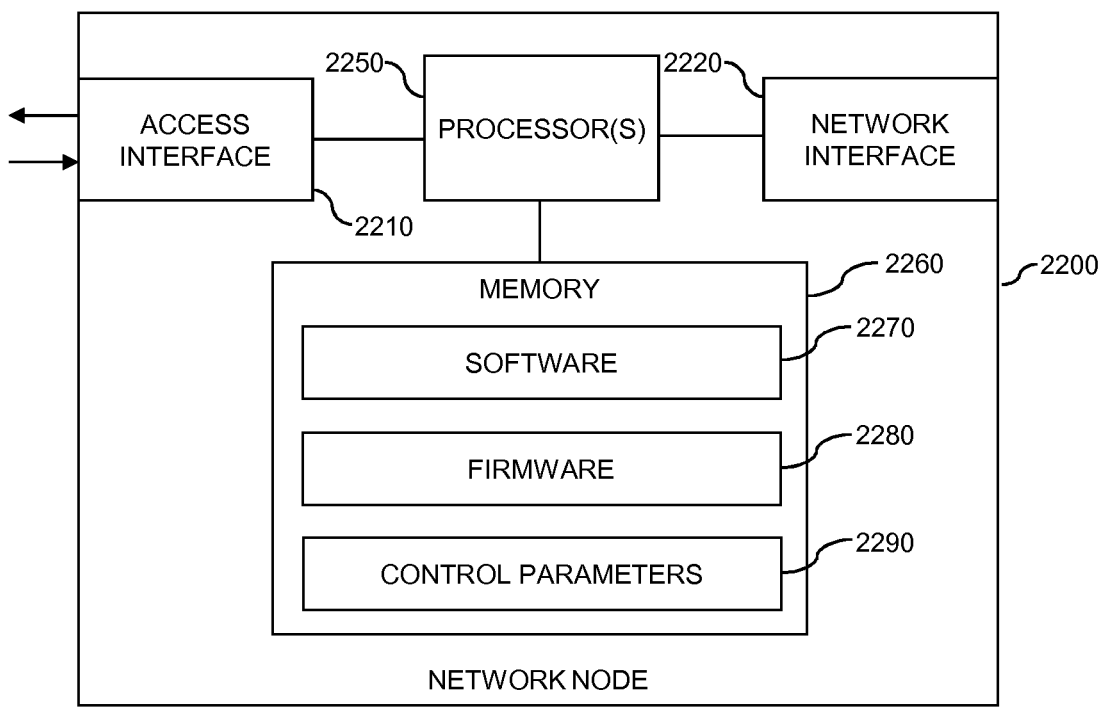
FIG. 22 schematically illustrates structures of a network node according to an embodiment of the invention.

FIG. 22 illustrates a processor-based implementation of a network node 2200 which may be used for implementing the above described concepts. For example, the structures as illustrated in FIG. 22 may be used for implementing the concepts in the above-mentioned access node 100.

As illustrated, the network node 2200 includes an access interface 2210. The access interface 2210 may be used for communication with one or more radio devices by DL radio transmissions and UL radio transmissions and for controlling these radio devices. If the network node corresponds to an access node, the access interface 2210 may be a radio interface. However, in some scenarios the network node 2200 could also correspond to a more centralized node, e.g., a core network node. In this case, the access interface 2200 could also correspond to an interface for communication with an access node serving the radio devices. The above-mentioned UE 20, UE 30 and UE 40 are examples of such radio devices. As further illustrated, the access node may also include a network interface 2220 which may be used for communication with other network nodes.

Further, the network node 2200 may include one or more processors 2250 coupled to the access interface 2210 and a memory 2260 coupled to the processor(s) 2250. By way of example, the access interface 2210, the processor(s) 2250, and the memory 2260 could be coupled by one or more internal bus systems of the network node 2200. The memory 2260 may include a ROM, e.g., a flash ROM, a RAM, e.g., a DRAM or SRAM, a mass storage, e.g., a hard disk or solid state disk, or the like. As illustrated, the memory 2260 may include software 2270, firmware 2280, and/or control parameters 2290. The memory 2260 may include suitably configured program code to be executed by the processor(s) 2250 so as to implement the above-described functionalities of a network node, such as explained in connection with FIGS. 19 and 20.

It is to be understood that the structures as illustrated in FIG. 22 are merely schematic and that the network node 2200 may actually include further components which, for the sake of clarity, have not been illustrated, e.g., further interfaces or processors. Also, it is to be understood that the memory 2260 may include further program code for implementing known functionalities of eNB of the LTE radio technology, a gNB of the NR radio technology, or similar network node. According to some embodiments, also a computer program may be provided for implementing functionalities of the network node 2200, e.g., in the form of a physical medium storing the program code and/or other data to be stored in the memory 2260 or by making the program code available for download or by streaming.

As can be seen, the concepts as described above may be used for controlling SL radio transmissions in a highly efficient manner. In particular, the concepts may enable usage of reference signals for precise estimation of a channel quality and/or interference level for a radio channel between UEs participating in SL radio communication. In this way, a unicast mode of the SL radio transmissions may be supported with high efficiency, while at the same time coexistence with a broadcast mode of the SL radio transmissions may be ensured. Further, inconsistency of estimates of channel quality or interference level may be avoided.

It is to be understood that the examples and embodiments as explained above are merely illustrative and susceptible to various modifications. For example, the illustrated concepts may be applied in connection with various kinds of radio technologies, without limitation to the above-mentioned examples of the LTE radio technology or NR radio technology. Further, it is noted that the concepts are not limited to supporting unicast mode SL radio transmissions by CSI-RS based channel estimation. Rather, it is to be understood that the concepts could also be applied to multicast mode of SL radio transmission, by considering multiple radio channels in the channel estimation process. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided by the present disclosure include:

Embodiment 1

A method of controlling sidelink communication in a wireless communication network, the method comprising:
- a radio device (30; 1000; 2100) receiving sidelink control information (301; 401) from a further radio device (20; 1200; 2100), the sidelink control information (301; 401) indicating at least one radio resource for transmission of a reference signal (304; 404) from the further radio device (20; 1200; 2100);
- the radio device (30; 1000; 2100) receiving the reference signal (304; 404) on the at least one radio resource indicated by the sidelink control information (301; 401);
- based on the received reference signal (304; 404), the radio device (30) estimating quality of a radio channel between the radio device (30; 1000; 2100) and the further radio device (20; 1200; 2100); and
- (A) based on the estimated quality of the radio channel, the radio device (30; 1000; 2100) controlling a sidelink radio transmission (306) from the radio device (30; 1000; 2100) to the further radio device (20; 1200; 2100) and/or (B) the radio device (30; 1000; 2100) sending a report of the estimated quality of the radio channel to the further radio device (20; 1200; 2100).

Embodiment 2

The method according to embodiment 1, comprising:
in response to the receiving the sidelink control information, the radio device (30; 1000; 2100) excluding the at least one radio resource from being used for a sidelink radio transmission by the radio device (30; 1000; 2100).

Embodiment 3

The method according to embodiment 1 or 2, comprising:
the radio device (30; 1000; 2100) receiving control information (501; 601; 612; 701; 702); and the radio device (30; 1000; 2100) receiving the sidelink control information (301; 401) on at least one radio resource configured based on the received control information (501; 601; 612; 701; 702).

Embodiment 4

The method according to embodiment 3, comprising:
the radio device (30; 1000; 2100) receiving at least a part of the control information (601; 612) from a node (100; 2000; 2200) of the wireless communication network.

Embodiment 5

The method according to embodiment 3 or 4, comprising:
the radio device (30; 1000; 2100) receiving at least a part of the control information (701) from the further radio device (20; 1200; 2100).

Embodiment 7

The method according to any one of embodiments 1 to 6, comprising:
the radio device (30; 1000; 2100) receiving the sidelink control information (301; 401) on at least one radio resource configured based on negotiation with the further radio device (20; 1200; 2100).

Embodiment 8

The method according to any one of embodiments 1 to 7, comprising:
the radio device (30; 1000; 2100) receiving the sidelink control information (301; 401) on at least one radio resource configured based on configuration information stored in the radio device (30; 1000; 2100).

Embodiment 9

The method according to any one of embodiments 1 to 8, comprising:
the radio device (30; 1000; 2100) forwarding (302, 402) the received sidelink control information to one or more other radio devices (40).

Embodiment 10

The method according to any one of embodiments 1 to 9, comprising:
the radio device (30; 1000; 2100) controlling whether to forward the received sidelink control information (301; 401) to one or more other radio devices (40) depending on at least one of: battery power level of the radio device (30; 1000; 2100), and availability of radio resources for forwarding (302, 402) of the sidelink control information.

Embodiment 11

The method according to any one of embodiments 1 to 10, comprising:
the radio device (30; 1000; 2100) controlling whether to forward the received sidelink control information (301; 401) to one or more other radio devices (40) depending on at least one of: priority of the sidelink radio transmission from the radio device (30; 1000; 2100), traffic type of the sidelink radio transmission from the radio device (30; 1000; 2100), a latency requirement of the sidelink radio transmission from the radio device (30; 1000; 2100), and a reliability requirement of the sidelink radio transmission from the radio device (30; 1000; 2100).

Embodiment 12

The method according to any one of embodiments 1 to 11, comprising:
the radio device (30; 1000; 2100) receiving a sidelink radio transmission (407) from the further radio device (20; 1200; 2100); and
the radio device (30; 1000; 2100) controlling whether to forward the received sidelink control information (401) to one or more other radio devices (40) depending on at least one of:
priority of the sidelink radio transmission (407) from the further radio device (20; 1200; 2100), traffic type of the sidelink radio transmission (407) from the further radio device (20; 1200; 2100), a latency requirement of the sidelink radio transmission (407) from the further radio device (20; 1000; 2100), and a reliability requirement of the sidelink radio transmission (407) from the further radio device (20; 1000; 2100).

Embodiment 13

The method according to any one of embodiments 1 to 12, comprising:
the radio device (30; 1000; 2100) sending sidelink radio transmissions (306) and reference signals on at least one radio resource which is further being utilized for sidelink radio transmissions (407) and transmissions of reference signals (304; 404) by at least one other radio device (20, 40; 1200; 2100); and
the radio device (30; 1000; 2100) configuring a time interval between an instance of transmission of the reference signals by the radio device (30; 1000; 2100) and a subsequent instance of transmission of the sidelink radio transmissions by the radio device (30; 1000; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1200; 2100).

Embodiment 14

The method according to embodiment 13, comprising:
the radio device (30; 1000; 2100) receiving control information from a node (100; 2000; 2200) of the wireless communication network; and
the radio device (30; 1000; 2100) configuring the time interval on the basis of the received control information.

Embodiment 15

The method according to embodiment 13 or 14, comprising:
the radio device (30; 1000; 2100) receiving the control information in a broadcast message which is also receivable by the at least one other radio device (20, 40; 1200; 2100).

Embodiment 16

The method according to any one of embodiments 13 to 15, wherein the time interval is zero.

Embodiment 17

The method according to any one of embodiments 13 to 16,
wherein the radio device (30; 1000; 2100) performs the sidelink radio transmissions according to a periodic time pattern.

Embodiment 18

A method of controlling sidelink communication in a wireless communication network, the method comprising:
a radio device (20; 1200; 2100) sending sidelink control information (301; 401; 503) to a further radio device (30; 1000; 2100), the sidelink control information indicating at least one radio resource for transmission of a reference signal (304; 404; 506) from the radio device (20; 1200; 2100);
the radio device (20; 1200; 2100) sending the reference signal (304; 404; 506) on the at least one radio resource indicated by the sidelink control information (301; 401; 503) to enable the further radio device (30; 1000; 2100) to estimate a quality of a radio channel between the further radio device (30; 1000; 2100) and the radio device (20; 1200; 2100) based on the reference signal (304; 404; 506); and
(A) the radio device (20; 1200; 2100) receiving a sidelink radio transmission (306) from the further radio device (30; 1000; 2100), the sidelink radio transmission (306) being controlled based on the quality of the radio channel estimated by the further radio device (30; 1000; 2100) and/or (B) the radio device (20; 1200; 2100) receiving a report (406) of the estimated quality of the radio channel from the further radio device (30; 1000; 2100) and controlling a sidelink radio transmission (407) from the radio device (20; 1200; 2100) to the further radio device (30; 1000; 2100) based on the estimated quality of the radio channel.

Embodiment 19

The method according to embodiment 18, comprising:
the radio device (20; 1200; 2100) receiving control information (502; 601; 611; 701); and
the radio device (20; 1200; 2100) sending the sidelink control information on at least one radio resource configured based on the received control information (502; 601; 611; 701).

Embodiment 20

The method according to embodiment 19, comprising:
the radio device (20; 1200; 2100) receiving at least a part of the control information (601; 611) from a node (100; 2000; 2200) of the wireless communication network.

Embodiment 21

The method according to embodiment 19 or 20, comprising:
the radio device (20; 1200; 2100) receiving at least a part of the control information (502; 701) from the further radio device (30; 1000; 2100).

Embodiment 22

The method according to any one of embodiments 18 to 21, comprising:
the radio device (20; 1200; 2100) sending the sidelink control information (301; 401; 503) on at least one radio resource configured based on negotiation with the further radio device (30; 1000; 2100).

Embodiment 23

The method according to any one of embodiments 18 to 22, comprising:
the radio device (20; 1200; 2100) sending the sidelink control information on at least one radio resource configured based on configuration information stored in the radio device (20; 1200; 2100).

Embodiment 24

The method according to any one of embodiments 18 to 23, comprising:
the radio device (20; 1200; 2100) sending sidelink radio transmissions (407) and reference signals (304; 404) on at least one radio resource which is further being utilized for sidelink radio transmissions (306) and transmissions of reference signals by at least one other radio device (30, 40; 1000; 2100); and
the radio device (20; 1200; 2100) configuring a time interval between an instance of transmission of the reference signals by the radio device (20; 1200; 2100) and a subsequent instance of transmission of the sidelink radio transmissions by the radio device (20; 1200; 2100) to be the same as a time interval between an instance of transmission of reference signals by the at least one other radio device (30, 40; 1000; 2100) and a subsequent instance of transmission of sidelink radio transmissions by the at least one other radio device (30, 40; 1000; 2100).

Embodiment 25

The method according to embodiment 24, comprising:
the radio device (20; 1200; 2100) receiving control information (601; 611) from a node (100; 2000; 2200) of the wireless communication network; and
the radio device (20) configuring the time interval on the basis of the received control information (601; 611).

Embodiment 26

The method according to embodiment 24 or 25, comprising:
the radio device (20; 1200; 2100) receiving the control information in a broadcast message (601) which is also receivable by the at least one other radio device (30, 40; 1000; 2100).

Embodiment 27

The method according to any one of embodiments 24 to 26,
wherein the time interval is zero.

Embodiment 28

The method according to any one of embodiments 24 to 27,
wherein the radio device (20; 1200; 2100) performs the sidelink radio transmissions according to a periodic time pattern.

Embodiment 29

A method of controlling sidelink communication in a wireless communication network, the method comprising:
a radio device (30; 1400; 2100) receiving sidelink control information (301; 401) from a further radio device (20; 1200; 2100), the sidelink control information (301; 401) indicating at least one radio resource for transmission of a reference signal (304; 404) from the further radio device (20; 1200; 2100); and
the radio device (30; 1400; 2100) forwarding (302, 402) the received sidelink control information (301; 401) to one or more other radio devices (40).

Embodiment 30

The method according to embodiment 29, comprising:
the radio device (30; 1400; 2100) controlling whether to forward the received sidelink control information (301; 401) to the one or more other radio devices (40) depending on at least one of: battery power level of the radio device (30; 1400; 2100), availability of radio resources for forwarding (302, 402) of the sidelink control information (301; 401).

Embodiment 31

The method according to embodiment 29 or 30, comprising:
the radio device (30; 1400; 2100) controlling whether to forward the received sidelink control information (301; 401) to the one or more other radio devices (40) depending on at least one of: priority of a sidelink radio transmission (306) from the radio device (30; 1400; 2100), traffic type of a sidelink radio transmission (306) from the radio device (30; 1400; 2100), a latency requirement of a sidelink radio transmission (306) from the radio device (30; 1400; 2100), and a reliability requirement of a sidelink radio transmission from the radio device (30; 1400; 2100).

Embodiment 32

The method according to any one of embodiments 29 to 31, comprising:
the radio device (30; 1400; 2100) controlling whether to forward the received sidelink control information to the one or more other radio devices (40) depending on at least one of: priority of a sidelink radio transmission (407) from the further radio device (20; 1200; 2100), traffic type of a sidelink radio transmission (407) from the further radio device (20; 1200; 2100), a latency requirement of a sidelink radio transmission (407) from the further radio device (20; 1200; 2100), and a reliability requirement of a sidelink radio transmission (407) from the further radio device (20; 1200; 2100).

Embodiment 33

The method according to any one of embodiments 29 to 32, comprising:
in response to the receiving the sidelink control information (301; 401), the radio device (30; 1400; 2100) excluding the at least one radio resource from being used for a sidelink radio transmission (306) by the radio device (30; 1400; 2100).

Embodiment 34

The method according to any one of embodiments 29 to 33, comprising:
the radio device (30; 1400; 2100) receiving control information (501; 601; 612; 701); and the radio device (30; 1400; 2100) receiving the sidelink control information (301; 401) on at least one radio resource configured based on the received control information (501; 601; 612; 701).

Embodiment 35

The method according to embodiment 34, comprising:
the radio device (30; 1400; 2100) receiving at least a part of the control information (601; 612) from a node (100; 2000; 2200) of the wireless communication network.

Embodiment 36

The method according to embodiment 34 or 35, comprising:
the radio device (30; 1400; 2100) receiving at least a part of the control information (501; 701) from the further radio device (20; 1200; 2100).

Embodiment 37

The method according to any one of embodiments 29 to 36, comprising:
the radio device (30; 1400; 2100) receiving the sidelink control information (301; 401) on at least one radio resource configured based negotiation with the further radio device (20; 1200; 2100).

Embodiment 38

The method according to any one of embodiments 29 to 37, comprising:
the radio device (30; 1400; 2100) receiving the sidelink control information (301; 401) on at least one radio resource configured based on configuration information stored in the radio device (30; 1400; 2100).

Embodiment 39

The method according to any one of embodiments 29 to 38, comprising:
the radio device (30; 1400; 2100) sending sidelink radio transmissions (306) and reference signals on at least one radio resource which is further being utilized for sidelink radio transmissions (407) and transmissions of reference signals (304; 404; 503) by at least one other radio device (20, 40); and
the radio device (30; 1400; 2100) configuring a time interval between an instance of transmission of reference signals by the radio device (30; 1400; 2100) and a subsequent instance of transmission of sidelink radio transmissions by the radio device (30; 1400; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1200; 2100).

Embodiment 40

The method according to embodiment 39, comprising:
the radio device (30; 1400; 2100) receiving control information (601; 612) from a node (100; 2000; 2200) of the wireless communication network; and
the radio device (30; 1400; 2100) configuring the time interval on the basis of the received control information (601; 612).

Embodiment 41

The method according to embodiment 39 or 40, comprising:
the radio device (30; 1400; 2100) receiving the control information in a broadcast message (601) which is also receivable by the at least one other radio device (20, 40; 1000; 2100).

Embodiment 42

The method according to any one of embodiments 39 to 41,
wherein the time interval is zero.

Embodiment 43

A method of controlling sidelink communication in a wireless communication network, the method comprising:
based on negotiation with a further radio device (20; 1200; 2100), a radio device (30; 1600; 2100) determining at least one first radio resource for sending first sidelink control information (503) by the further radio device (20; 1200; 2100), the first sidelink control information (503) indicating at least one second radio resource for transmission of a reference signal (506) from the further radio device (20; 1200; 2100);
the radio device (30; 1600; 2100) sending second sidelink control information (504) on the indicated at least one first radio resource to one or more other radio devices (40), the second sidelink control information (504) indicating the at least one second radio resource.

Embodiment 44

The method according to embodiment 43, comprising:
the radio device (30; 1600; 2100) controlling whether to send the second sidelink control information (504) to the one or more other radio devices (40) depending on at least one of: battery power level of the radio device (30; 1600; 2100), availability of radio resources for sending the second sidelink control information (504).

Embodiment 45

The method according to embodiment 43 or 44, comprising:
the radio device (30; 1600; 2100) controlling whether to send the second sidelink control information (504) to the one or more other radio devices (40) depending on at least one of: priority of a sidelink radio transmission (306) from the radio device (30; 1600; 2100), traffic type of a sidelink radio transmission (306) from the radio device (30; 1600; 2100), a latency requirement of a sidelink radio transmission (306) from the radio device (30; 1600; 2100), and a reliability requirement of a sidelink radio transmission (306) from the radio device (30; 1600; 2100).

Embodiment 46

The method according to any one of embodiments 43 to 45, comprising:
the radio device (30; 1600; 2100) controlling whether to send the second sidelink control information (504) to the one or more other radio devices (40) depending on at least one of: priority of a sidelink radio transmission (407) from the further radio device (20; 1200; 2100), traffic type of a sidelink radio transmission (407) from the further radio device (20; 1200; 2100), a latency requirement of a sidelink radio transmission (407) from the further radio device (20; 1200; 2100), and a reliability requirement of a sidelink radio transmission (407) from the further radio device (20; 1600; 2100).

Embodiment 47

The method according to any one of embodiments 43 to 46, comprising:
the radio device (30; 1600; 2100) excluding the at least one second radio resource from being used for a sidelink radio transmission (306) by the radio device (30; 1600; 2100).

Embodiment 48

The method according to any one of embodiments 43 to 47,
wherein the second sidelink control information (504) is identical to the first sidelink control information (503).

Embodiment 49

The method according to any one of embodiments 43 to 47,
wherein the second sidelink control information (504) further indicates at least one third radio resource for transmission of a further reference signal from the radio device (30; 1600; 2100).

Embodiment 50

The method according to any one of embodiments 43 to 49, comprising:
the radio device (30; 1600; 2100) sending sidelink radio transmissions (306) and reference signals on at least one radio resource which is further being utilized for sidelink radio transmissions (407) and transmissions of reference signals (304; 404; 506) by at least one other radio device (20, 40; 1200; 2100); and
the radio device (30; 1600; 2100) configuring a time interval between an instance of transmission of the reference signals by the radio device (30; 1600; 2100) and a subsequent instance of transmission of the sidelink radio transmissions by the radio device (30; 1600; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1600; 2100).

Embodiment 51

The method according to embodiment 50, comprising:
the radio device (30; 1600; 2100) receiving control information (601; 612) from a node (100; 2000; 2200) of the wireless communication network; and
the radio device (30; 1600; 2100) configuring the time interval on the basis of the received control information (601; 612).

Embodiment 52

The method according to embodiment 50 or 51, comprising:
the radio device (30; 1600; 2100) receiving the control information in a broadcast message (601) which is also receivable by the at least one other radio device (20, 40; 1600; 2100).

Embodiment 53

The method according to any one of embodiments 50 to 52,
wherein the time interval is zero.

Embodiment 54

The method according to any one of embodiments 50 to 53,
wherein the radio device (30; 1600; 2100) performs the sidelink radio transmissions according to a periodic time pattern.

Embodiment 55

A method of controlling sidelink communication in a wireless communication network, the method comprising:
a radio device (20, 30, 40; 1000; 1200; 1400; 1600; 1800; 2100) sending sidelink radio transmissions (306; 407) and reference signals (304; 404; 506) on at least one radio resource which is further being utilized for sidelink radio transmissions (306; 407) and transmissions of reference signals (304; 404; 506) by at least one other radio device (20, 30, 40; 1000; 1200; 1400; 1600; 1800; 2100); and
the radio device (20, 30, 40; 1000; 1200; 1400; 1600; 1800; 2100) configuring a time interval between an instance of transmission of the reference signals by the radio device (20, 30, 40; 1000; 1200; 1400; 1600; 1800; 2100) and a subsequent instance of transmission of the sidelink radio transmissions by the radio device (20, 30, 40; 1000; 1200; 1400; 1600; 1800; 2100) to be the same as a time interval between an instance of transmission of the reference signals by the at least one other radio device (20, 30, 40; 1000; 1200; 1400; 1600; 1800; 2100) and a subsequent instance of transmission of the sidelink radio transmissions by the at least one other radio device (20, 30, 40; 1000; 1200; 1400; 1600; 1800; 2100).

Embodiment 56

The method according to embodiment 55, comprising:
the radio device (20, 30, 40; 1000; 1200; 1400; 1600; 1800; 2100) receiving control information (601; 611, 612, 613) from a node (100; 2000; 2200) of the wireless communication network; and
the radio device (20, 30, 40; 1000; 1200; 1400; 1600; 1800; 2100) configuring the time interval on the basis of the received control information (601; 611, 612, 613).

Embodiment 57

The method according to embodiment 55 or 56, comprising:
the radio device (20, 30, 40; 1000; 1200; 1400; 1600; 1800; 2100) receiving the control information in a broadcast message (601) which is also receivable by the at least one other radio device (20, 30, 40; 1000; 1200; 1400; 1600; 1800; 2100).

Embodiment 58

The method according to any one of embodiments 55 to 57, comprising:
the radio device (20, 30, 40; 1000; 1200; 1400; 1600; 1800; 2100) configuring the time interval on the basis of configuration information stored in the radio device (20, 30, 40; 1000; 1200; 1400; 1600; 1800; 2100).

Embodiment 59

The method according to any one of embodiments 55 to 58,
wherein the time interval is zero.

Embodiment 60

The method according to any one of embodiments 55 to 59, comprising:
the radio device (20, 30, 40; 1000; 1200; 1400; 1600; 1800; 2100) receiving at least one of the reference signal transmissions by the at least one other radio device (20, 30, 40; 1000; 1200; 1400; 1600; 1800; 2100); and based on the received reference signal, the radio device (20, 30, 40; 1000; 1200; 1400; 1600; 1800; 2100) estimating quality of a radio channel between the radio device (20, 30, 40; 1000; 1200; 1400; 1600; 1800; 2100) and the at least one other radio device (20, 30, 40; 1000; 1200; 1400; 1600; 1800; 2100).

Embodiment 61

The method according to embodiment 60, comprising:

based on the estimated quality of the radio channel, the radio device (20, 30, 40; 1000; 1200; 1400; 1600; 1800; 2100) controlling at least one of the sidelink radio transmissions by the radio device (20, 30, 40; 1000; 1200; 1400; 1600; 1800; 2100).

Embodiment 62

The method according to embodiment 60 or 61, comprising:

the radio device (20, 30, 40; 1000; 1200; 1400; 1600; 1800; 2100) reporting the estimated quality of the radio channel to the at least one other radio device (20, 30, 40; 1000; 1200; 1400; 1600; 1800; 2100).

Embodiment 63

The method according to any one of embodiments 55 to 62, comprising:

the radio device (20, 30, 40; 1000; 1200; 1400; 1600; 1800; 2100) receiving at least one of the reference signal transmissions by the at least one other radio device (20, 30, 40; 1000; 1200; 1400; 1600; 1800; 2100); and based on the received reference signal, the radio device (20, 30, 40; 1000; 1200; 1400; 1600; 1800; 2100) estimating an interference level on a radio channel between the radio device (20, 30, 40; 1000; 1200; 1400; 1600; 1800; 2100) and the at least one other radio device (20, 30, 40; 1000; 1200; 1400; 1600; 1800; 2100).

Embodiment 64

The method according to embodiment 63, comprising:

based on the estimated interference level on the radio channel, the radio device (20, 30, 40; 1000; 1200; 1400; 1600; 1800; 2100) controlling at least one of the sidelink radio transmissions by the radio device (20, 30, 40; 1000; 1200; 1400; 1600; 1800; 2100).

Embodiment 65

The method according to embodiment 63 or 64, comprising:

the radio device (20, 30, 40; 1000; 1200; 1400; 1600; 1800; 2100) reporting the estimated interference level on the radio channel to the at least one other radio device (20, 30, 40; 1000; 1200; 1400; 1600; 1800; 2100).

Embodiment 66

The method according to any one of embodiments 55 to 65, wherein the radio device (20, 30, 40; 1000; 1200; 1400; 1600; 1800; 2100) performs the sidelink radio transmissions by the radio device (20, 30, 40; 1000; 1200; 1400; 1600; 1800; 2100) according to a periodic time pattern.

Embodiment 67

A method of controlling sidelink communication in a wireless communication network, the method comprising:

a node (100; 2000; 2200) of the wireless communication network providing control information (601; 611, 612, 613) to multiple radio devices (20, 30, 40; 1000; 1200; 1400; 1600; 1800; 2100) utilizing at least one radio resource for sidelink radio transmissions (306; 407) and transmissions of reference signals (304; 404; 506), wherein the control information (601; 611; 612; 613) configures a time interval between an instance of transmission of the reference signals and a subsequent instance of transmission of the sidelink radio transmissions to be the same for each of the multiple radio devices (20, 30, 40; 1000; 1200; 1400; 1600; 1800; 2100).

Embodiment 68

The method according to embodiment 67, comprising:

the node (100; 2000; 2200) sending the control information in a broadcast message which is receivable by the multiple radio devices (20, 30, 40; 1000; 1200; 1400; 1600; 1800; 2100).

Embodiment 69

The method according to 67 or 68,
wherein the time interval is zero.

Embodiment 70

The method according to any one of embodiments 67 to 69, wherein for at least one of the multiple radio devices (20, 30, 40; 1000; 1200; 1400; 1600; 1800; 2100) the sidelink radio transmissions by the radio device (20, 30, 40; 1000; 1200; 1400; 1600; 1800; 2100) are performed according to a periodic time pattern.

Embodiment 71

A radio device (30; 1000; 2100) for a wireless communication network, the radio device (30; 1000; 2100) being configured to:

receive sidelink control information (301; 401) from a further radio device (20; 1200; 2100), the sidelink control information (301; 401) indicating at least one radio resource for transmission of a reference signal (304; 404) from the further radio device (20; 1200; 2100);

receive the reference signal (304; 404) on the at least one radio resource indicated by the sidelink control information (301; 401);

based on the received reference signal (304; 404), estimate quality of a radio channel between the radio device (30; 1000; 2100) and the further radio device (20; 1200; 2100); and (A) based on the estimated quality of the radio channel, control a sidelink radio transmission (306) from the radio device (30; 1000; 2100) to the further radio device (20; 1200; 2100) and/or (B) send a report of the estimated quality of the radio channel to the further radio device (20; 1000; 2100).

Embodiment 72

The radio device (30; 1000; 2100) according to embodiment 71,
wherein the radio device (30; 1000; 2100) is configured to:
in response to the receiving the sidelink control information, the radio device (30; 1000; 2100) excluding the at least one radio resource from being used for a sidelink radio transmission by the radio device (30; 1000; 2100).

Embodiment 73

The radio device (30; 1000; 2100) according to embodiment 71 or 72,
wherein the radio device (30; 1000; 2100) is configured to:
receive control information (501; 601; 612; 701; 702); and
receive the sidelink control information (301; 401) on at least one radio resource configured based on the received control information (501; 601; 612; 701; 702).

Embodiment 74

The radio device (30; 1000; 2100) according to embodiment 73,
wherein the radio device (30; 1000; 2100) is configured to receive at least a part of the control information (601; 612) from a node (100; 2000; 2200) of the wireless communication network.

Embodiment 75

The radio device (30; 1000; 2100) according to embodiment 73 or 74,
wherein the radio device (30; 1000; 2100) is configured to receive at least a part of the control information (701) from the further radio device (20; 1200; 2100).

Embodiment 76

The radio device (30; 1000; 2100) according to any one of embodiments 71 to 76,
wherein the radio device (30; 1000; 2100) is configured to receive the sidelink control information (301; 401) on at least one radio resource configured based on negotiation with the further radio device (20; 1200; 2100).

Embodiment 78

The radio device (30; 1000; 2100) according to any one of embodiments 71 to 77,
wherein the radio device (30; 1000; 2100) is configured to receive the sidelink control information (301; 401) on at least one radio resource configured based on configuration information stored in the radio device (30; 1000; 2100).

Embodiment 79

The radio device (30; 1000; 2100) according to any one of embodiments 71 to 78,
wherein the radio device (30; 1000; 2100) is configured to forward (302, 402) the received sidelink control information to one or more other radio devices (40).

Embodiment 80

The radio device (30; 1000; 2100) according to any one of embodiments 71 to 79,
wherein the radio device (30; 1000; 2100) is configured to control whether to forward the received sidelink control information (301; 401) to one or more other radio devices (40) depending on at least one of: battery power level of the radio device (30; 1000; 2100), and availability of radio resources for forwarding (302, 402) of the sidelink control information.

Embodiment 81

The radio device (30; 1000; 2100) according to any one of embodiments 71 to 80,
wherein the radio device (30; 1000; 2100) is configured to control whether to forward the received sidelink control information (301; 401) to one or more other radio devices (40) depending on at least one of:
priority of the sidelink radio transmission from the radio device (30; 1000; 2100), traffic type of the sidelink radio transmission from the radio device (30; 1000; 2100), a latency requirement of the sidelink radio transmission from the radio device (30; 1000; 2100), and a reliability requirement of the sidelink radio transmission from the radio device (30; 1000; 2100).

Embodiment 82

The radio device (30; 1000; 2100) according to any one of embodiments 71 to 81,
wherein the radio device (30; 1000; 2100) is configured to:
receive a sidelink radio transmission (407) from the further radio device (20; 1200; 2100); and
control whether to forward the received sidelink control information (401) to one or more other radio devices (40) depending on at least one of:
priority of the sidelink radio transmission (407) from the further radio device (20; 1200; 2100), traffic type of the sidelink radio transmission (407) from the further radio device (20; 1200; 2100), a latency requirement of the sidelink radio transmission (407) from the further radio device (20; 1000; 2100), and a reliability requirement of the sidelink radio transmission (407) from the further radio device (20; 1000; 2100).

Embodiment 83

The radio device (30; 1000; 2100) according to any one of embodiments 71 to 82,
wherein the radio device (30; 1000; 2100) is configured to:
send sidelink radio transmissions (306) and reference signals on at least one radio resource which is further being utilized for sidelink radio transmissions (407) and transmissions of reference signals (304; 404) by at least one other radio device (20, 40; 1200; 2100); and
configure a time interval between an instance of transmission of the reference signals by the radio device (30; 1000; 2100) and a subsequent instance of transmission of the sidelink radio transmissions by the radio device (30; 1000; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1200; 2100).

Embodiment 84

The radio device (30; 1000; 2100) according to embodiment 83,
wherein the radio device (30; 1000; 2100) is configured to:
receive control information from a node (100; 2000; 2200) of the wireless communication network; and
configure the time interval on the basis of the received control information.

Embodiment 85

The radio device (30; 1000; 2100) according to embodiment 83 or 84,
wherein the radio device (30; 1000; 2100) is configured to receive the control information in a broadcast message which is also receivable by the at least one other radio device (20, 40; 1200; 2100).

Embodiment 86

The radio device (30; 1000; 2100) according to any one of embodiments 83 to 85,
wherein the time interval is zero.

Embodiment 87

The radio device (30; 1000; 2100) according to any one of embodiments 83 to 86,
wherein the radio device (30; 1000; 2100) is configured to perform the sidelink radio transmissions according to a periodic time pattern.

Embodiment 88

The radio device (30; 1000; 2100) according to embodiment 71,
wherein the radio device (30; 1000; 2100) is configured to perform the steps of a method according to any one of embodiments 2 to 17.

Embodiment 89

A radio device (20; 1200; 2100) for a wireless communication network, the radio device (20; 1200; 2100) being configured to:
send sidelink control information (301; 401; 503) to a further radio device (30; 1000; 2100), the sidelink control information (301; 401; 503) indicating at least one radio resource for transmission of a reference signal (304; 404; 506) from the radio device (20; 1200; 2100);
send the reference signal (304; 404; 506) on the radio resources indicated by the sidelink control information (301; 401; 506) to enable the further radio device (30; 1000; 2100) to estimate a quality of a radio channel between the further radio device (30; 1000; 2100) and the radio device (20; 1200; 2100) based on the reference signal; and
(A) receive a sidelink radio transmission (306) from the further radio device (30; 1000; 2100), the sidelink radio transmission being controlled based on the quality of the radio channel estimated by the further radio device (30; 1000; 2100) and/or (B) receive a report (406) of the estimated quality of the radio channel from the further radio device (30; 1000; 2100) and control a sidelink radio transmission (407) from the radio device (20; 1200; 2100) to the further radio device (30; 1000; 2100) based on the estimated quality of the radio channel.

Embodiment 90

The radio device (20; 1200; 2100) according to embodiment 89,
wherein the radio device (20; 1200; 2100) is configured to:
receive control information (502; 601; 611; 701); and
send the sidelink control information on at least one radio resource configured based on the received control information (502; 601; 611; 701).

Embodiment 91

The radio device (20; 1200; 2100) according to embodiment 90,
wherein the radio device (20; 1200; 2100) is configured to receive at least a part of the control information (601; 611) from a node (100; 2000; 2200) of the wireless communication network.

Embodiment 92

The radio device (20; 1200; 2100) according to embodiment 90 or 91,
wherein the radio device (20; 1200; 2100) is configured to receive at least a part of the control information (502; 701) from the further radio device (30; 1000; 2100).

Embodiment 93

The radio device (20; 1200; 2100) according to any one of embodiments 89 to 92,
wherein the radio device (20; 1200; 2100) is configured to send the sidelink control information (301; 401; 503) on at least one radio resource configured based on negotiation with the further radio device (30; 1000; 2100).

Embodiment 94

The radio device (20; 1200; 2100) according to any one of embodiments 89 to 93,
wherein the radio device (20; 1200; 2100) is configured to send the sidelink control information on at least one radio resource configured based on configuration information stored in the radio device (20; 1200; 2100).

Embodiment 95

The radio device (20; 1200; 2100) according to any one of embodiments 89 to 94,
wherein the radio device (20; 1200; 2100) is configured to:
send sidelink radio transmissions (407) and reference signals (304; 404) on at least one radio resource which is further being utilized for sidelink radio transmissions (306) and transmissions of reference signals by at least one other radio device (30, 40; 1000; 2100); and
configure a time interval between an instance of transmission of the reference signals by the radio device (20; 1200; 2100) and a subsequent instance of transmission of the sidelink radio transmissions by the radio device (20; 1200; 2100) to be the same as a time interval between an instance of transmission of reference signals by the at least one other radio device (30, 40; 1000; 2100) and a subsequent instance of transmission of sidelink radio transmissions by the at least one other radio device (30, 40; 1000; 2100).

Embodiment 96

The radio device (20; 1200; 2100) according to embodiment 95,
wherein the radio device (20; 1200; 2100) is configured to:
receive control information (601; 611) from a node (100; 2000; 2200) of the wireless communication network; and
configure the time interval on the basis of the received control information (601; 611).

Embodiment 97

The radio device (20; 1200; 2100) according to embodiment 95 or 96,
wherein the radio device (20; 1200; 2100) is configured to receive the control information in a broadcast message (601) which is also receivable by the at least one other radio device (30, 40; 1000; 2100).

Embodiment 98

The radio device (20; 1200; 2100) according to any one of embodiments 95 to 97,
wherein the time interval is zero.

Embodiment 99

The radio device (20; 1200; 2100) according to any one of embodiments 95 to 98,
wherein the radio device (20; 1200; 2100) is configured to perform the sidelink radio transmissions according to a periodic time pattern.

Embodiment 100

The radio device (20; 1200; 2100) according to embodiment 89,
wherein the radio device (20; 1200; 2100) is configured to perform the steps of a method according to any one of embodiments 19 to 28.

Embodiment 101

A radio device (30; 1400; 2100) for a wireless communication network, the radio device (30) being configured to:
receive sidelink control information (301; 401) from a further radio device (20; 1200; 2100), the sidelink control information (301; 401) indicating at least one radio resource for transmission of a reference signal (304; 404) from the further radio device (20); and
forward (302, 402) the received sidelink control information (301; 401) to one or more other radio devices (40).

Embodiment 102

The radio device (30; 1400; 2100) according to embodiment 101,
wherein the radio device (30; 1400; 2100) is configured to control whether to forward the received sidelink control information (301; 401) to the one or more other radio devices (40) depending on at least one of: battery power level of the radio device (30; 1400; 2100), availability of radio resources for forwarding (302, 402) of the sidelink control information (301; 401).

Embodiment 103

The radio device (30; 1400; 2100) according to embodiment 101 or 102,
wherein the radio device (30; 1400; 2100) is configured to control whether to forward the received sidelink control information (301; 401) to the one or more other radio devices (40) depending on at least one of: priority of a sidelink radio transmission (306) from the radio device (30; 1400; 2100), traffic type of a sidelink radio transmission (306) from the radio device (30; 1400; 2100), a latency requirement of a sidelink radio transmission (306) from the radio device (30; 1400; 2100), and a reliability requirement of a sidelink radio transmission from the radio device (30; 1400; 2100).

Embodiment 104

The radio device (30; 1400; 2100) according to any one of embodiments 101 to 103,
wherein the radio device (30; 1400; 2100) is configured to control whether to forward the received sidelink control information to the one or more other radio devices (40) depending on at least one of: priority of a sidelink radio transmission (407) from the further radio device (20; 1200; 2100), traffic type of a sidelink radio transmission (407) from the further radio device (20; 1200; 2100), a latency requirement of a sidelink radio transmission (407) from the further radio device (20; 1200; 2100), and a reliability requirement of a sidelink radio transmission (407) from the further radio device (20; 1200; 2100).

Embodiment 105

The radio device (30; 1400; 2100) according to any one of embodiments 101 to 104,
wherein the radio device (30; 1400; 2100) is configured to:
in response to the receiving the sidelink control information (301; 401), exclude the at least one radio resource from being used for a sidelink radio transmission (306) by the radio device (30; 1400; 2100).

Embodiment 106

The radio device (30; 1400; 2100) according to any one of embodiments 101 to 105,
wherein the radio device (30; 1400; 2100) is configured to:
receive control information (501; 601; 612; 701); and
receive the sidelink control information (301; 401) on at least one radio resource configured based on the received control information (501; 601; 612; 701).

Embodiment 107

The radio device (30; 1400; 2100) according to embodiment 106,
wherein the radio device (30; 1400; 2100) is configured to receive at least a part of the control information (601; 612) from a node (100; 2000; 2200) of the wireless communication network.

Embodiment 108

The radio device (30; 1400; 2100) according to embodiment 106 or 107,
wherein the radio device (30; 1400; 2100) is configured to receive at least a part of the control information (501; 701) from the further radio device (20; 1200; 2100).

Embodiment 109

The radio device (30; 1400; 2100) according to any one of embodiments 101 to 108,
wherein the radio device (30; 1400; 2100) is configured to receive the sidelink control information (301; 401) on at least one radio resource configured based negotiation with the further radio device (20; 1200; 2100).

Embodiment 110

The radio device (30; 1400; 2100) according to any one of embodiments 101 to 109,
wherein the radio device (30; 1400; 2100) is configured to receive the sidelink control information (301; 401) on at least one radio resource configured based on configuration information stored in the radio device (30; 1400; 2100).

Embodiment 111

The radio device (30; 1400; 2100) according to any one of embodiments 101 to 110,
wherein the radio device (30; 1400; 2100) is configured to:
send sidelink radio transmissions (306) and reference signals on at least one radio resource which is further being utilized for sidelink radio transmissions (407) and transmissions of reference signals (304; 404; 503) by at least one other radio device (20, 40); and
configure a time interval between an instance of transmission of reference signals by the radio device (30; 1400; 2100) and a subsequent instance of transmission of sidelink radio transmissions by the radio device (30; 1400; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1200; 2100).

Embodiment 112

The radio device (30; 1400; 2100) according to embodiment 111,
wherein the radio device (30; 1400; 2100) is configured to:
receive control information (601; 612) from a node (100; 2000; 2200) of the wireless communication network; and
configure the time interval on the basis of the received control information (601; 612).

Embodiment 113

The radio device (30; 1400; 2100) according to embodiment 111 or 112,
wherein the radio device (30; 1400; 2100) is configured to receive the control information in a broadcast message (601) which is also receivable by the at least one other radio device (20, 40; 1000; 2100).

Embodiment 114

The radio device (30; 1400; 2100) according to any one of embodiments 111 to 113,
wherein the time interval is zero.

Embodiment 115

The radio device (30; 1400; 2100) according to embodiment 75,
wherein the radio device (30; 1400; 2100) is configured to perform the steps of a method according to any one of embodiments 30 to 42.

Embodiment 116

A radio device (30; 1600; 2100) for a wireless communication network, the radio device (30; 1600; 2100) being configured to:
based on negotiation with a further radio device (20; 1200; 2100), determine at least one first radio resource for sending first sidelink control information (503) by the further radio device (20; 1200; 2100), the first sidelink control information indicating at least one second radio resource for transmission of a reference signal (506) from the further radio device (20; 1200; 2100);
send second sidelink control information (504) on the indicated at least one first radio resource to one or more other radio devices (40), the second sidelink control information (504) indicating the at least one second radio resource.

Embodiment 117

The radio device (30; 1600; 2100) according to embodiment 116,
wherein the radio device (30; 1600; 2100) is configured to control whether to send the second sidelink control information (504) to the one or more other radio devices (40) depending on at least one of: battery power level of the radio device (30; 1600; 2100), availability of radio resources for sending the second sidelink control information (504).

Embodiment 118

The radio device (30; 1600; 2100) according to embodiment 116 or 117,
wherein the radio device (30; 1600; 2100) is configured to control whether to send the second sidelink control information (504) to the one or more other radio devices (40) depending on at least one of: priority of a sidelink radio transmission (306) from the radio device (30; 1600; 2100), traffic type of a sidelink radio transmission (306) from the radio device (30; 1600; 2100), a latency requirement of a sidelink radio transmission (306) from the radio device (30; 1600; 2100), and a reliability requirement of a sidelink radio transmission (306) from the radio device (30; 1600; 2100).

Embodiment 119

The radio device (30; 1600; 2100) according to any one of embodiments 116 to 118,
wherein the radio device (30; 1600; 2100) is configured to control whether to send the second sidelink control information (504) to the one or more other radio devices (40) depending on at least one of: priority of a sidelink radio transmission (407) from the further radio device (20; 1200; 2100), traffic type of a sidelink radio transmission (407) from the further radio device (20; 1200; 2100), a latency requirement of a sidelink radio transmission (407) from the further radio device (20; 1200; 2100), and a reliability requirement of a sidelink radio transmission (407) from the further radio device (20; 1600; 2100).

Embodiment 120

The radio device (30; 1600; 2100) according to any one of embodiments 116 to 119,
wherein the radio device (30; 1600; 2100) is configured to exclude the at least one second radio resource from being used for a sidelink radio transmission (306) by the radio device (30; 1600; 2100).

Embodiment 121

The radio device (30; 1600; 2100) according to any one of embodiments 116 to 120,
wherein the second sidelink control information (504) is identical to the first sidelink control information (503).

Embodiment 122

The radio device (30; 1600; 2100) according to any one of embodiments 116 to 120,
wherein the second sidelink control information (504) further indicates at least one third radio resource for transmission of a further reference signal from the radio device (30; 1600; 2100).

Embodiment 123

The radio device (30; 1600; 2100) according to any one of embodiments 116 to 122,
wherein the radio device (30; 1600; 2100) is configured to:
send sidelink radio transmissions (306) and reference signals on at least one radio resource which is further being utilized for sidelink radio transmissions (407) and transmissions of reference signals (304; 404; 506) by at least one other radio device (20, 40; 1200; 2100); and
configure a time interval between an instance of transmission of the reference signals by the radio device (30; 1600; 2100) and a subsequent instance of transmission of the sidelink radio transmissions by the radio device (30; 1600; 2100) to be the same as a time interval between an instance of transmission of the reference signals by the at least one other radio device (20, 40; 1200; 2100) and a subsequent instance of transmission of the sidelink radio transmissions by the at least one other radio device (20, 40; 1600; 2100).

Embodiment 124

The radio device (30; 1600; 2100) according to embodiment 123,
wherein the radio device (30; 1600; 2100) is configured to:
receive control information (601; 612) from a node (100; 2000; 2200) of the wireless communication network; and
configure the time interval on the basis of the received control information (601; 612).

Embodiment 125

The radio device (30; 1600; 2100) according to embodiment 123 or 124,
wherein the radio device (30; 1600; 2100) is configured to receive the control information in a broadcast message (601) which is also receivable by the at least one other radio device (20, 40; 1600; 2100).

Embodiment 126

The radio device (30; 1600; 2100) according to any one of embodiments 123 to 124,
wherein the time interval is zero.

Embodiment 127

The radio device (30; 1600; 2100) according to any one of embodiments 123 to 126,
wherein the radio device (30; 1600; 2100) is configured to perform the sidelink radio transmissions according to a periodic time pattern.

Embodiment 128

The radio device (30; 1600; 2100) according to embodiment 116,
wherein the radio device (30; 1600; 2100) is configured to perform the steps of a method according to any one of embodiments 44 to 54.

Embodiment 129

A system, comprising:
a first radio device (20; 1200; 2100) and a second radio device (30; 1000; 2100),
the first radio device (20; 1200; 2100) being configured to:
  send sidelink control information (301; 401) to the second radio device (30; 1000; 2100), the sidelink control information (301; 401) indicating at least one radio resource for transmission of a reference signal (304; 404) from the first radio device (20; 1200; 2100);
  send the reference signal (304; 404) on the radio resources indicated by the sidelink control information (301; 401); and
  receive a sidelink radio transmission (306) from the second radio device (30; 1000; 2100),
the second radio device (30; 1000; 2100) being configured to:
  receive the sidelink control information (301; 401) from the first radio device (20; 1200; 2100);
  receive the reference signal (304; 404) on the at least one radio resource indicated by the sidelink control information (301; 401);
  based on the received reference signal, estimate quality of a radio channel between the first radio device (20; 1200; 2100) and the second radio device (30; 1000; 2100); and
  based on the estimated quality of the radio channel, control the sidelink radio transmission from the second radio device (30; 1000; 2100) to the first radio device (20; 1200; 2100).

Embodiment 130

A system, comprising:
a first radio device (20; 1200; 2100) and a second radio device (30; 1000; 2100),
the first radio device (20; 1200; 2100) being configured to:
  send sidelink control information (301; 401) to the second radio device (30; 1000; 2100), the sidelink control information (301; 401) indicating at least one radio resource for transmission of a reference signal (304; 404) from the first radio device (20; 1200; 2100);
  send the reference signal (304; 404) on the radio resources indicated by the sidelink control information (301; 401);
  receive a report (406) of an estimated quality of the radio channel from the second radio device (30; 1000; 2100); and
  control a sidelink radio transmission (407) from the first radio device (20; 1200; 2100) to the second radio device (30; 1000; 2100) based on the estimated quality of the radio channel,
the second radio device (30; 1000; 2100) being configured to:
  receive the sidelink control information (301; 401) from the first radio device (20; 1200; 2100);
  receive the reference signal (304; 404) on the at least one radio resource indicated by the sidelink control information (301; 401);
  based on the received reference signal (304; 404), estimate quality of a radio channel between the first radio device (20; 1200; 2100) and the second radio device (30; 1000; 2100); and
  send the report (406) of the estimated quality of the radio channel to the first radio device (20; 1200; 2100).

Embodiment 131

The system according to embodiment 129 or 130, further comprising:
  at least one third radio device (40),
  wherein the at least one third radio device (40) is configured to exclude the at least one radio resource from being used for a sidelink radio transmission by the third radio device (40).

Embodiment 132

The system according to embodiment 131,
  wherein the second radio device (30; 1000; 2100) is configured to forward (302, 402) the sidelink control information (301; 401) to the at least one third radio device (40).

Embodiment 133

A radio device (20, 30, 40; 1000; 1200; 1400; 1600; 1800) for a wireless communication network, the radio device (20, 30, 40; 1000; 1200; 1400; 1600; 1800) being configured to:
  send sidelink radio transmissions (306; 407) and reference signals (304; 404; 506) on at least one radio resource which is further being utilized for sidelink radio transmissions (306; 407) and transmissions of reference signals (304; 404; 506) by at least one other radio device (20, 30, 40; 1000; 1200; 1400; 1600; 1800); and
  configure a time interval between an instance of transmission of the reference signals by the radio device (20, 30, 40; 1000; 1200; 1400; 1600; 1800) and a subsequent instance of transmission of the sidelink radio transmissions by the radio device (20, 30, 40; 1000; 1200; 1400; 1600; 1800) to be the same as a time interval between an instance of transmission of the reference signals by the at least one other radio device (20, 30, 40; 1000; 1200; 1400; 1600; 1800) and a subsequent instance of transmission of the sidelink radio transmissions by the at least one other radio device (20, 30, 40; 1000; 1200; 1400; 1600; 1800).

Embodiment 134

The radio device (20, 30, 40; 1000; 1200; 1400; 1600; 1800) according to embodiment 133,
  wherein the radio device (20, 30, 40; 1000; 1200; 1400; 1600; 1800) is configured to:
    receive control information (601; 611, 612, 613) from a node (100; 2000; 2200) of the wireless communication network; and
    configure the time interval on the basis of the received control information (601; 611, 612, 613).

Embodiment 135

The radio device (20, 30, 40; 1000; 1200; 1400; 1600; 1800) according to embodiment 133 or 134,
  wherein the radio device (20, 30, 40; 1000; 1200; 1400; 1600; 1800) is configured to receive the control information in a broadcast message (601) which is also receivable by the at least one other radio device (20, 30, 40; 1000; 1200; 1400; 1600; 1800; 2100).

Embodiment 136

The radio device (20, 30, 40; 1000; 1200; 1400; 1600; 1800) according to any one of embodiments 133 to 135,
wherein the radio device (20, 30, 40; 1000; 1200; 1400; 1600; 1800) is configured to configure the time interval on the basis of configuration information stored in the radio device (20, 30, 40; 1000; 1200; 1400; 1600; 1800; 2100).

Embodiment 137

The radio device (20, 30, 40; 1000; 1200; 1400; 1600; 1800) according to any one of embodiments 133 to 136, wherein the time interval is zero.

Embodiment 138

The radio device (20, 30, 40; 1000; 1200; 1400; 1600; 1800) according to any one of embodiments 133 to 137,
wherein the radio device (20, 30, 40; 1000; 1200; 1400; 1600; 1800) is configured to:
receive at least one of the reference signal transmissions by the at least one other radio device (20, 30, 40; 1000; 1200; 1400; 1600; 1800; 2100); and
based on the received reference signal, estimate quality of a radio channel between the radio device (20, 30, 40; 1000; 1200; 1400; 1600; 1800; 2100) and the at least one other radio device (20, 30, 40; 1000; 1200; 1400; 1600; 1800; 2100).

Embodiment 139

The radio device (20, 30, 40; 1000; 1200; 1400; 1600; 1800) according to embodiment 138,
wherein the radio device (20, 30, 40; 1000; 1200; 1400; 1600; 1800) is configured to:
based on the estimated quality of the radio channel, control at least one of the sidelink radio transmissions by the radio device (20, 30, 40; 1000; 1200; 1400; 1600; 1800; 2100).

Embodiment 140

The radio device (20, 30, 40; 1000; 1200; 1400; 1600; 1800) according to embodiment 138 or 139,
wherein the radio device (20, 30, 40; 1000; 1200; 1400; 1600; 1800) is configured to report the estimated quality of the radio channel to the at least one other radio device (20, 30, 40; 1000; 1200; 1400; 1600; 1800; 2100).

Embodiment 141

The radio device (20, 30, 40; 1000; 1200; 1400; 1600; 1800) according to any one of embodiments 133 to 140,
wherein the radio device (20, 30, 40; 1000; 1200; 1400; 1600; 1800) is configured to:
receive at least one of the reference signal transmissions by the at least one other radio device (20, 30, 40; 1000; 1200; 1400; 1600; 1800; 2100); and
based on the received reference signal, estimate an interference level on a radio channel between the radio device (20, 30, 40; 1000; 1200; 1400; 1600; 1800; 2100) and the at least one other radio device (20, 30, 40; 1000; 1200; 1400; 1600; 1800; 2100).

Embodiment 142

The radio device (20, 30, 40; 1000; 1200; 1400; 1600; 1800) according to embodiment 141,
wherein the radio device (20, 30, 40; 1000; 1200; 1400; 1600; 1800) is configured to:
based on the estimated interference level on the radio channel, control at least one of the sidelink radio transmissions by the radio device (20, 30, 40; 1000; 1200; 1400; 1600; 1800; 2100).

Embodiment 143

The radio device (20, 30, 40; 1000; 1200; 1400; 1600; 1800) according to embodiment 141 or 142,
wherein the radio device (20, 30, 40; 1000; 1200; 1400; 1600; 1800) is configured to report the estimated interference level on the radio channel to the at least one other radio device (20, 30, 40; 1000; 1200; 1400; 1600; 1800; 2100).

Embodiment 144

The radio device (20, 30, 40; 1000; 1200; 1400; 1600; 1800) according to any one of embodiments 133 to 143,
wherein the radio device (20, 30, 40; 1000; 1200; 1400; 1600; 1800; 2100) is configured to perform the sidelink radio transmissions by the radio device (20, 30, 40; 1000; 1200; 1400; 1600; 1800; 2100) according to a periodic time pattern.

Embodiment 145

The radio device (20, 30, 40; 1000; 1200; 1400; 1600; 1800) according to embodiment 133,
wherein the radio device (20, 30, 40; 1000; 1200; 1400; 1600; 1800) is configured to perform the steps of a method according to any one of embodiments 56 to 66.

Embodiment 146

A node (100; 2000; 2200) for a wireless communication network, the node (100; 2000; 2200) being configured to:
provide control information to multiple radio devices (20, 30, 40; 1000; 1200; 1400; 1600; 1800) utilizing at least one radio resource for sidelink radio transmissions (306; 407) and transmissions of reference signals (304; 404; 506),
wherein the control information configures a time interval between an instance of transmission of the reference signals and a subsequent instance of transmission of the sidelink radio transmissions to be the same for each of the multiple radio devices (20, 30, 40; 1000; 1200; 1400; 1600; 1800).

Embodiment 147

The node (100; 2000; 2200) according to embodiment 146,
the node (100; 2000; 2200) is configured to send the control information in a broadcast message which is receivable by the multiple radio devices (20, 30, 40; 1000; 1200; 1400; 1600; 1800; 2100).

Embodiment 148

The node (100; 2000; 2200) according to 146 or 147, wherein the time interval is zero.

Embodiment 149

The node (100; 2000; 2200) according to any one of embodiments 146 to 148,
wherein for at least one of the multiple radio devices (20, 30, 40; 1000; 1200; 1400; 1600; 1800; 2100) the sidelink radio transmissions by the radio device (20, 30, 40; 1000; 1200; 1400; 1600; 1800; 2100) are performed according to a periodic time pattern.

Embodiment 150

The node (100; 2000; 2200) according to embodiment 146,
wherein the node (100; 2000; 2200) is configured to perform the steps of a method according to any one of embodiments 68 to 70.

Embodiment 151

A system, comprising:
multiple radio devices (20, 30, 40; 1000; 1200; 1400; 1600; 1800),
each of the multiple radio devices (20, 30, 40; 1000; 1200; 1400; 1600; 1800) being configured to:
send sidelink radio transmissions (306; 407) and reference signals (304; 404; 506) on at least one radio resource; and
configure a time interval between an instance of transmission of the reference signals by the radio device (20, 30, 40; 1000; 1200; 1400; 1600; 1800) and a subsequent instance of transmission of the sidelink radio transmissions by the radio device (20, 30, 40; 1000; 1200; 1400; 1600; 1800) to be the same as a time interval between an instance of transmission of the reference signals by each other of the multiple radio devices (20, 30, 40; 1000; 1200; 1400; 1600; 1800) and a subsequent instance of transmission of the sidelink radio transmissions by this other radio device (20, 30, 40; 1000; 1200; 1400; 1600; 1800).

Embodiment 152

The system according to embodiment 151, further comprising:
a node (100; 2000; 2200) of a wireless communication network, the node (100; 2000; 2200) being configured to provide control information for configuring the time interval to the multiple radio devices (20, 30, 40; 1000; 1200; 1400; 1600; 1800).

Embodiment 153

A computer program comprising program code to be executed by at least one processor (2150) of a radio device (20, 30, 40; 1000; 1200; 1400; 1600; 1800), whereby execution of the program code causes the radio device (20, 30, 40; 1000; 1200; 1400; 1600; 1800) to perform a method according to any one of embodiments 1 to 66.

Embodiment 154

A computer program product comprising program code to be executed by at least one processor (2150) of a radio device (20, 30, 40; 1000; 1200; 1400; 1600; 1800), whereby execution of the program code causes the radio device (20, 30, 40; 1000; 1200; 1400; 1600; 1800) to perform a method according to any one of embodiments 1 to 66.

Embodiment 155

A computer program comprising program code to be executed by at least one processor (2250) of a node (100; 2000; 2200) of a wireless communication network, whereby execution of the program code causes the node (100; 2000; 2200) to perform a method according to any one of embodiments 67 to 70.

Embodiment 156

A computer program product comprising program code to be executed by at least one processor (2150) of a node (100; 2000; 2200) of a wireless communication network, whereby execution of the program code causes the node (100; 2000; 2200) to perform a method according to any one of embodiments 67 to 70.

The invention claimed is:

1. A method of controlling sidelink communication in a wireless communication network, the method comprising:
a radio device receiving sidelink control information from a further radio device, the sidelink control information indicating at least one radio resource for transmission of a reference signal from the further radio device;
the radio device receiving the reference signal on the at least one radio resource indicated by the sidelink control information;
based on the received reference signal, the radio device estimating quality of a radio channel between the radio device and the further radio device;
at least one of:
(A) based on the estimated quality of the radio channel, the radio device controlling a sidelink radio transmission from the radio device to the further radio device; and
(B) the radio device sending a report of the estimated quality of the radio channel to the further radio device;
the radio device sending sidelink radio transmissions and reference signals on at least one radio resource which is further being utilized for sidelink radio transmissions and transmissions of reference signals by at least one other radio device; and
the radio device configuring a time interval between an instance of transmission of the reference signals by the radio device and a subsequent instance of transmission of the sidelink radio transmissions by the radio device to be the same as a time interval between an instance of transmission of the reference signals by the at least one other radio device and a subsequent instance of transmission of the sidelink radio transmissions by the at least one other radio device.

2. The method according to claim 1, comprising:
in response to the receiving the sidelink control information, the radio device excluding the at least one radio resource from being used for a sidelink radio transmission by the radio device.

3. The method according to claim 1, comprising:
the radio device receiving control information; and
the radio device receiving the sidelink control information on at least one radio resource configured based on the received control information.

4. The method according to claim 3, comprising:
the radio device receiving at least a part of the control information from a node of the wireless communication network.

5. The method according to claim 3, comprising:
the radio device receiving at least a part of the control information from the further radio device.

6. The method according to claim 1, comprising:
the radio device receiving the sidelink control information on at least one radio resource configured based on negotiation with the further radio device.

7. The method according to claim 1, comprising:
the radio device receiving the sidelink control information on at least one radio resource configured based on configuration information stored in the radio device.

8. The method according to claim 1, comprising:
the radio device forwarding the received sidelink control information to one or more other radio devices.

9. The method according to claim 1, comprising:
the radio device controlling whether to forward the received sidelink control information to one or more other radio devices depending on at least one of:
battery power level of the radio device; and
availability of radio resources for forwarding of the sidelink control information.

10. The method according to claim 1, comprising:
the radio device controlling whether to forward the received sidelink control information to one or more other radio devices depending on at least one of:
priority of the sidelink radio transmission from the radio device;
traffic type of the sidelink radio transmission from the radio device;
a latency requirement of the sidelink radio transmission from the radio device; and
a reliability requirement of the sidelink radio transmission from the radio device.

11. The method according to claim 1, comprising:
the radio device receiving a sidelink radio transmission from the further radio device; and
the radio device controlling whether to forward the received sidelink control information to one or more other radio devices depending on at least one of:
priority of the sidelink radio transmission from the further radio device;
traffic type of the sidelink radio transmission from the further radio device;
a latency requirement of the sidelink radio transmission from the further radio device; and
a reliability requirement of the sidelink radio transmission from the further radio device.

12. The method according to claim 1, comprising:
the radio device receiving control information from a node of the wireless communication network; and
the radio device configuring the time interval on the basis of the received control information.

13. A method of controlling sidelink communication in a wireless communication network, the method comprising:
a radio device sending sidelink control information to a further radio device, the sidelink control information indicating at least one radio resource for transmission of a reference signal from the radio device;
the radio device sending the reference signal on the at least one radio resource indicated by the sidelink control information to enable the further radio device to estimate a quality of a radio channel between the further radio device and the radio device based on the reference signal;
at least one of:
(A) the radio device receiving a sidelink radio transmission from the further radio device, the sidelink radio transmission being controlled based on the quality of the radio channel estimated by the further radio device; and
(B) the radio device receiving a report of the estimated quality of the radio channel from the further radio device and controlling a sidelink radio transmission from the radio device to the further radio device based on the estimated quality of the radio channel;
the radio device sending sidelink radio transmissions and reference signals on at least one radio resource which is further being utilized for sidelink radio transmissions and transmissions of reference signals by at least one other radio device; and
the radio device configuring a time interval between an instance of transmission of the reference signals by the radio device and a subsequent instance of transmission of the sidelink radio transmissions by the radio device to be the same as a time interval between an instance of transmission of reference signals by the at least one other radio device and a subsequent instance of transmission of sidelink radio transmissions by the at least one other radio device.

14. The method according to claim 13, comprising:
the radio device receiving control information; and the radio device sending the sidelink control information on at least one radio resource configured based on the received control information.

15. The method according to claim 14, comprising:
the radio device receiving at least a part of the control information from a node of the wireless communication network.

16. The method according to claim 14, comprising:
the radio device receiving at least a part of the control information from the further radio device.

17. The method according to claim 14, comprising:
the radio device sending the sidelink control information on at least one radio resource configured based on negotiation with the further radio device.

18. The method according to claim 14, comprising:
the radio device sending the sidelink control information on at least one radio resource configured based on configuration information stored in the radio device.

19. A radio device for a wireless communication network, the radio device being configured to:
receive sidelink control information from a further radio device, the sidelink control information indicating at least one radio resource for transmission of a reference signal from the further radio device;
receive the reference signal on the at least one radio resource indicated by the sidelink control information;
based on the received reference signal, estimate quality of a radio channel between the radio device and the further radio device;
at least one of:
(A) based on the estimated quality of the radio channel, control a sidelink radio transmission from the radio device to the further radio device; and
(B) send a report of the estimated quality of the radio channel to the further radio device;
send sidelink radio transmissions and reference signals on at least one radio resource which is further being utilized for sidelink radio transmissions and transmissions of reference signals by at least one other radio device; and configure a time interval between an instance of transmission of the reference signals by the radio device and a subsequent instance of transmission of the sidelink radio transmissions by the radio device to be the same as a time interval between an instance of transmission of the reference signals by the at least one other radio device and a subsequent instance of transmission of the sidelink radio transmissions by the at least one other radio device.

20. A radio device for a wireless communication network, the radio device being configured to:

send sidelink control information to a further radio device, the sidelink control information indicating at least one radio resource for transmission of a reference signal from the radio device;

send the reference signal on the radio resources indicated by the sidelink control information to enable the further radio device to estimate a quality of a radio channel between the further radio device and the radio device based on the reference signal;

at least one of:

(A) receive a sidelink radio transmission from the further radio device, the sidelink radio transmission being controlled based on the quality of the radio channel estimated by the further radio device; and (B) receive a report of the estimated quality of the radio channel from the further radio device and control a sidelink radio transmission from the radio device to the further radio device based on the estimated quality of the radio channel;

send sidelink radio transmissions and reference signals on at least one radio resource which is further being utilized for sidelink radio transmissions and transmissions of reference signals by at least one other radio device; and—configure a time interval between an instance of transmission of the reference signals by the radio device and a subsequent instance of transmission of the sidelink radio transmissions by the radio device to be the same as a time interval between an instance of transmission of reference signals by the at least one other radio device and a subsequent instance of transmission of sidelink radio transmissions by the at least one other radio device.

* * * * *